United States Patent
Hassan et al.

(10) Patent No.: US 10,992,729 B2
(45) Date of Patent: Apr. 27, 2021

(54) ENDPOINT CONFIGURATION FOR A COMMUNICATION SESSION

(71) Applicant: Microsoft Technology Licensing, LLC, Redmond, WA (US)

(72) Inventors: Amer Aref Hassan, Kirkland, WA (US); Timothy Mark Moore, Bellevue, WA (US); Gareth L. E. Bridges, Redmond, WA (US); Gunter Leeb, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/490,631

(22) Filed: Apr. 18, 2017

(65) Prior Publication Data

US 2018/0302457 A1    Oct. 18, 2018

(51) Int. Cl.
*H04L 12/28* (2006.01)
*H04L 29/06* (2006.01)
(Continued)

(52) U.S. Cl.
CPC .......... *H04L 65/80* (2013.01); *H04L 41/0816* (2013.01); *H04L 41/0893* (2013.01); *H04L 45/22* (2013.01); *H04L 45/302* (2013.01); *H04L 45/3065* (2013.01); *H04L 67/10* (2013.01); *H04L 67/34* (2013.01); *H04W 40/12* (2013.01); *H04L 41/12* (2013.01); *H04L 41/5009* (2013.01);
(Continued)

(58) Field of Classification Search
CPC ....................................................... H04L 12/50
USPC ......................................................... 370/329
See application file for complete search history.

(56) References Cited

U.S. PATENT DOCUMENTS

| | | | |
|---|---|---|---|
| 7,466,810 B1 | 12/2008 | Quon et al. | |
| 7,912,510 B2 * | 3/2011 | Park | H04M 3/42017 |
| | | | 455/414.1 |

(Continued)

FOREIGN PATENT DOCUMENTS

WO    2017023629 A1    2/2017

OTHER PUBLICATIONS

Alexiou, et al., "Adopting FEC for Reliable Multicasting over LTE Networks", In Proceedings of 13th ACM International Conference on Modeling, Analysis, and Simulation of Wireless and Mobile Systems, Oct. 17, 2010, pp. 307-310.

(Continued)

*Primary Examiner* — Dang T Ton
(74) *Attorney, Agent, or Firm* — Schwegman Lundberg & Woessner, P.A.

(57) ABSTRACT

Techniques for endpoint configuration for a communication session are described. According to various implementations, a cloud-based connectivity service maintains network path information that identifies routing paths for routing communication sessions across different networks. The connectivity service is also able to determine configuration information for configuring endpoint devices to participate in a communication session. According to various implementations, configuration information is determined based on a packet quality of a routing path. Thus, an endpoint device can apply the configuration information to attempt to increase packet quality across a routing path, and thus increase media quality for a communication session at the endpoint device.

21 Claims, 12 Drawing Sheets

(51) Int. Cl.
  H04L 29/08 (2006.01)
  H04L 12/24 (2006.01)
  H04L 12/725 (2013.01)
  H04W 40/12 (2009.01)
  H04L 12/707 (2013.01)
  *H04L 12/751* (2013.01)
  *H04L 12/26* (2006.01)
  *H04L 12/851* (2013.01)

(52) U.S. Cl.
  CPC .......... *H04L 41/5022* (2013.01); *H04L 43/08* (2013.01); *H04L 45/08* (2013.01); *H04L 47/24* (2013.01); *H04L 67/14* (2013.01)

(56) References Cited

U.S. PATENT DOCUMENTS

| | | | |
|---|---|---|---|
| 8,595,758 | B2 | 11/2013 | Taylor et al. |
| 8,959,139 | B2 * | 2/2015 | Medved .................. H04L 45/00 709/201 |
| 9,171,540 | B2 * | 10/2015 | Wei ....................... H04L 1/0061 |
| 9,371,007 | B1 | 6/2016 | Penilla et al. |
| 9,461,923 | B2 | 10/2016 | Li |
| 2002/0172149 | A1 | 11/2002 | Kinoshita et al. |
| 2006/0262786 | A1 | 11/2006 | Shimizu et al. |
| 2009/0304380 | A1 | 12/2009 | Sadananda et al. |
| 2011/0064079 | A1 | 3/2011 | Lim et al. |
| 2011/0135312 | A1 | 6/2011 | El-ahmadi et al. |
| 2011/0149950 | A1 | 6/2011 | Petit-huguenin et al. |
| 2012/0330804 | A1 * | 12/2012 | Morrill ................. H04M 15/00 705/34 |
| 2013/0223277 | A1 | 8/2013 | Decusatis et al. |
| 2015/0055945 | A1 | 2/2015 | Wellbrock et al. |
| 2015/0113164 | A1 * | 4/2015 | Butler .................... H04L 45/22 709/239 |
| 2015/0117198 | A1 | 4/2015 | Menezes et al. |
| 2015/0135012 | A1 | 5/2015 | Bhalla et al. |
| 2015/0143339 | A1 | 5/2015 | Rajanna et al. |
| 2015/0254214 | A1 | 9/2015 | Rosenberg |
| 2016/0028854 | A1 | 1/2016 | Leeb et al. |
| 2016/0065422 | A1 | 3/2016 | Khargharia et al. |
| 2016/0189440 | A1 | 6/2016 | Cattone |
| 2016/0191391 | A1 | 6/2016 | Wood et al. |
| 2016/0217301 | A1 * | 7/2016 | Watanabe ........... H04L 63/0407 |
| 2016/0285628 | A1 | 9/2016 | Carer et al. |
| 2016/0323066 | A1 | 11/2016 | Duggan et al. |
| 2016/0330106 | A1 | 11/2016 | Menezes et al. |
| 2016/0359665 | A1 | 12/2016 | Raleigh |
| 2017/0317932 | A1 | 11/2017 | Paramasivam |
| 2017/0336214 | A1 | 11/2017 | Lynch |

OTHER PUBLICATIONS

Barve, et al., "A Performance based Routing Classification in Cognitive Radio Networks", In International Journal of Computer Applications, vol. 44, No. 19, Apr. 2012, pp. 11-21.
Fox, et al., "A Framework for Network Monitoring and Performance Based Routing in Distributed Middleware Systems", In Doctoral Dissertation, Oct. 25, 2006, 7 pages.
Tucker, et al., "Real-Time Call Quality Metrics via Software Defined Networking (SDN) on Skype for Business", https://channel9.msdn.com/Events/Ignite/2015/BRK3174, Published on: May 3, 2015, 3 pages.
"Skype for Business, SDN Interface 2.2", https://www.microsoft.com/en-in/download/details.aspx?id=44274, Retrieved on: Jan. 1, 2017, 6 pages.
Bhowmik, et al., "Bandwidth-Efficient Content-Based Routing on Software-Defined Networks", In Proceedings of the 10th ACM International Conference on Distributed and Event-based Systems, Jun. 20, 2016, pp. 137-144.
An, et al., "Consistent Route Update in Software-Defined Networks", In Proceedings of 3rd International Conference on Cloud Networking (CloudNet), Oct. 8, 2014, pp. 84-89.
Jiang, et al., "Comparison of Fec and Codec Robustnmess on Voip Quality and Bandwidth Efficiency", In Journal of Networks, Jun. 5, 2002, 12 Pages.
"International Search Report and Written Opinion Issued in PCT Application No. PCT/US18/026361", dated Jul. 9, 2018, 16 Pages.
"Non Final Office Action issued in U.S. Appl. No. 15/471,844", dated Nov. 15, 2018, 18 Pages.

* cited by examiner

ENDPOINT CONFIGURATION FOR A COMMUNICATION SESSION

BACKGROUND

Modern communication systems have an array of capabilities, including integration of various communication modalities with different services. For example, communication modalities available to users include voice/video communications, instant messaging, data/application sharing, white-boarding, and presence. Furthermore, collaboration systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, determining optimal networks for transmitting UC data is difficult since devices involved in UC sessions are typically unaware of network attributes. Further, UC is typically implemented via software that can be loaded on mobile devices, e.g., tablets, smartphones, laptops, and so forth. Thus, techniques for managing UC communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for endpoint configuration for a communication session are described. According to various implementations, a cloud-based connectivity service maintains network path information that identifies routing paths for routing communication sessions across different networks. The connectivity service is also able to determine configuration information for configuring endpoint devices to participate in a communication session. Further, the connectivity service is able to provide network information to the endpoint device for endpoint device self-configuring. According to various implementations, configuration information is determined based on packet quality of a routing path. Thus, an endpoint device can apply the configuration information to attempt to increase packet quality across a routing path, and thus increase media quality for a communication session at the endpoint device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
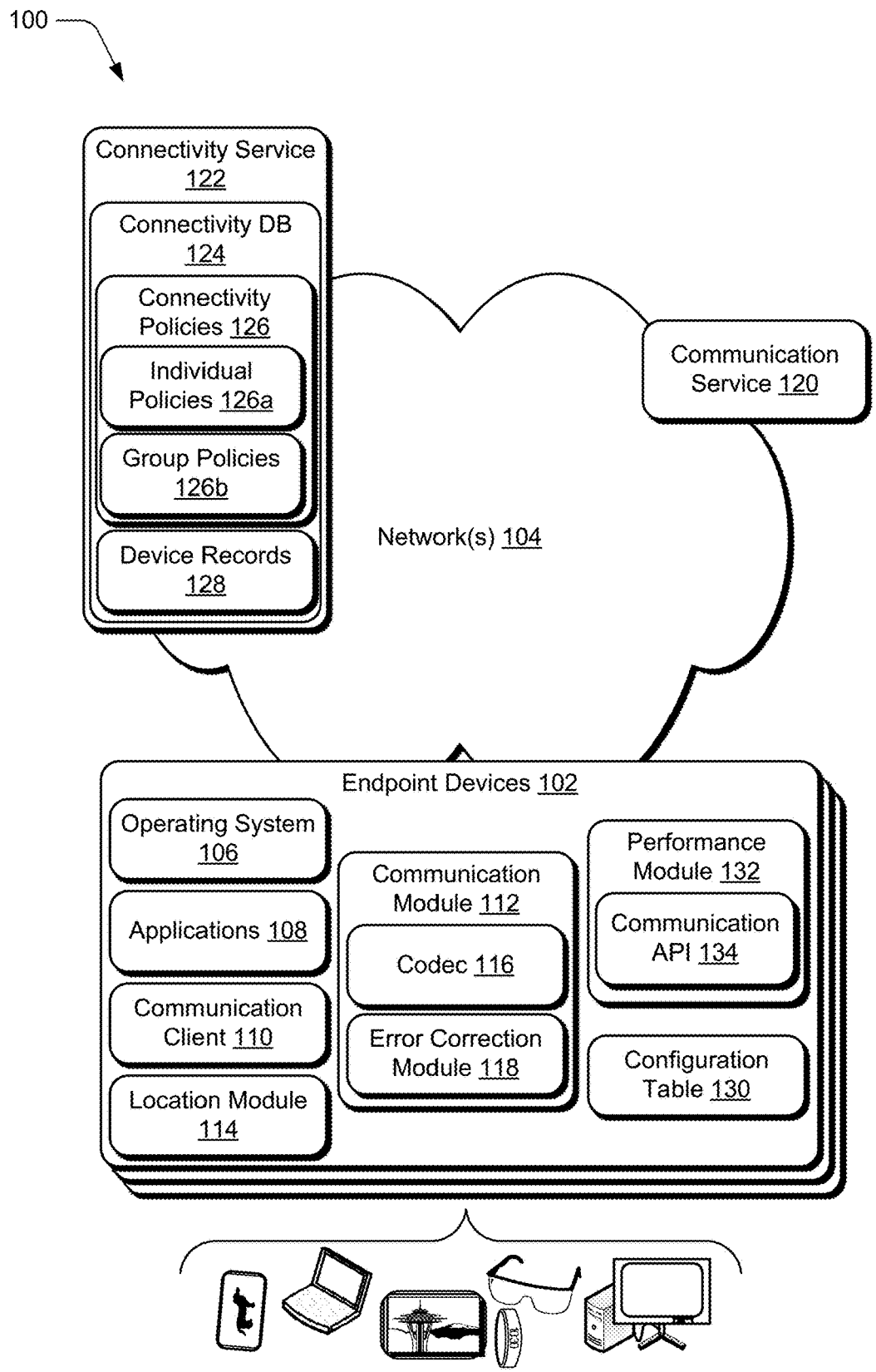
FIG. 1 is an illustration of an environment in an example implementation that is operable to employ techniques discussed herein.

Techniques for endpoint configuration for a communication session are described. According to various implementations, a cloud-based connectivity service maintains network path information that identifies routing paths for routing communication sessions across different networks. Further, each routing path is associated with a quality metric, or a set of quality metrics. Examples of a communication session include a Voice over Internet Protocol (VoIP) call, a video call, text messaging, a file transfer, and/or combinations thereof. Examples of quality metrics include packet error rate, delay, and delay jitter. A communication session, for instance, is typically implemented via Internet Protocol (IP).

The connectivity service is also able to determine configuration information for configuring endpoint devices to participate in a communication session. An entity such as a communication service and/or an endpoint device can query the connectivity service for a routing path for routing a communication session, and the connectivity service can respond identifying a routing path. In at least some implementations, the connectivity service selects a routing path based on a historical and/or real-time packet quality for the routing path. The connectivity service can also provide configuration information for configuring endpoint devices to participate in a communication session over the routing path. Alternatively or additionally, the connectivity service can notify the endpoint device of the routing path and quality metric information for packets across the routing path. Thus, based on the quality metric, the endpoint device can determine whether and how to configure itself for packet-based communication across the routing path.

According to various implementations, configuration information is determined based on a packet quality of a routing path. For example, if a routing path is determined to have poor packet quality, configuration information is configured to be applied to attempt to improve packet quality across the routing path. As further detailed below, configuration information can include settings for various endpoint device functionalities, such as a codec, an error correction functionality, a jitter buffer, and so forth. Thus, an endpoint device can apply the configuration information to attempt to increase packet quality across a routing path, and thus increase media quality for a communication session at the endpoint device.

Accordingly, techniques described herein enable packet quality for communication sessions to be improved by enabling endpoint devices to be configured and reconfigured based on packet quality across a routing path.

In the following discussion, an example environment is first described that is operable to employ techniques described herein. The next section describes some example implementation scenarios in accordance with one or more implementations. The section following this describes some example procedures in accordance with one or more implementations. The final section presents an example system and device that are operable to employ techniques discussed herein in accordance with one or more implementations.

Having presented an overview of example implementations in accordance with one or more implementations, consider now an example environment in which example implementations may by employed.

FIG. 1 is an illustration of an environment 100 in an example implementation that is operable to employ techniques endpoint configuration for a communication session described herein. Generally, the environment 100 includes various devices, services, and networks that enable communication via a variety of different modalities. For instance, the environment 100 includes endpoint devices 102 connected to networks 104. Generally, the endpoint devices 102 may be configured in a variety of ways, such as a traditional computer (e.g., a desktop personal computer, laptop computer, and so on), a smartphone, an Internet Protocol (IP) phone, a wearable device, a netbook, a handheld device (e.g., a tablet), an entertainment appliance, a game console, and so forth.

The networks 104 provide the endpoint devices 102 with connectivity to various networks and/or services, such as those provided over the Internet. The networks 104, for instance, enable data to be transmitted via wired and/or wireless connections between the endpoint devices 102. The networks 104 may be implemented via a variety of different instances and combinations of connectivity technologies, such as wireless cellular (e.g., LTE), broadband cable, digital subscriber line (DSL), wireless data connectivity (e.g., Wi-Fi™), last mile or backhauling (e.g., T1), Multi-protocol Label Switching (MPLS), and so forth. In at least some implementations, the networks 104 represent different interconnected wired and wireless networks.

The endpoint devices 102 include a variety of different functionalities that enable various activities and tasks to be performed. For instance, the endpoint device 102 include an operating system 106, applications 108, a communication client 110, a communication module 112, and a location module 114. Generally, the operating system 106 is representative of functionality for abstracting various system components of the endpoint devices 102, such as hardware, kernel-level modules and services, and so forth. The operating system 106, for instance, can abstract various components of the endpoint devices 102 to the applications 108 to enable interaction between the components and the applications 108.

The applications 108 represent functionalities for performing different tasks via the endpoint devices 102. Examples of the applications 108 include a word processing application, a spreadsheet application, a web browser, a gaming application, and so forth. The applications 108 may be installed locally on the endpoint devices 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication client 110 is representative of functionality to enable different forms of communication via the endpoint devices 102, such as for communication between different instances of the endpoint devices 102. Examples of the communication client 110 include a voice communication application (e.g., a VoIP client), a UC client, a video communication application, a messaging application, a content sharing application, and combinations thereof. The communication client 110, for instance, enables different communication modalities to be combined to provide diverse communication scenarios. In at least some implementations, the communication client 110 represents an application that is installed on the endpoint devices 102. Additionally or alternatively, the communication client 110 can be implemented as a portal to a remote application, such as accessed via a web browser, a web application, and so forth.

According to one or more implementations, communication between the endpoint devices 102 occurs between different instances of the communication client 110. For example, a communication session between the endpoint devices 102 represents an exchange of communication media between different instances of the communication client 110. In at least some implementations, the communication client 110 represents an application that executes at an application layer of the endpoint devices 102.

The communication module 112 of the endpoint devices 102 is representative of functionality for enabling the endpoint devices 102 to communicate via wireless and/or wired data transmission over the networks 104. For instance, the communication module 112 represents hardware and logic for data communication over the networks 104 via a variety of different wired and wireless technologies and protocols.

The communication module 112 includes a codec 116 and an error correction module 118. Generally, the codec 116 is representative of functionality for encoding and decoding data streams, such as part of communication sessions between the endpoint devices 102. The error correction module 118 is representative of functionality to apply various types of error correction to data streams transmitted and received by the endpoint devices 102. Examples of error correction that are applicable by the error correction module 118 include forward error correction (FEC), data interleaving, cyclical redundancy checks (CRC), cryptographic protocols, and so forth.

As further detailed below, the codec 116 and the error correction module 118 can be configured in a variety of different ways to account for varying packet quality across the networks 104. The communication module 112 may include other components not expressly illustrated herein, such as an encryption module for encrypting and decrypting data, a radio frequency (RF) modulator for modulating and demodulating data, RF components (e.g., antennas, radios, and so forth) for transmitting and receiving RF signal, and so forth.

The location module 114 is representative of functionality to determine locations of the endpoint devices 102. For example, the location module 114 may receive location information from one or more external location systems, such as Global Positioning System (GPS) coordinates from one or more GPS satellites, location information from a wireless cellular service, map information from a mapping service, and so forth. The location module 114 may provide such location information to other entities and functionalities, such as the various functionalities and entities discussed in the environment 100. As further detailed herein, location information may be utilized to identify preferred networks at different locations for the endpoint devices 102.

The environment 100 further includes a communication service 120, which is representative of a service to perform various tasks for management of communication between the endpoint devices 102. The communication service 120, for instance, can manage initiation, moderation, and termination of communication sessions. Examples of the communication service 120 include a VoIP service, an online conferencing service, a UC service, and so forth. In at least some implementations, the communication service 120 may be implemented as or be connected to a private branch exchange (PBX) in communication with a Public Switched Telephone Network ("PSTN") to enable voice communication between the endpoint devices 102.

According to one or more implementations, the communication client 110 is managed and/or hosted by the communication service 120. For instance, the communication client 110 represents an interface to communication services provided by the communication service 120.

The environment 100 further includes a connectivity service 122, which is representative of a network-based (e.g., cloud-based) service that provides network intelligence and endpoint configuration information to various entities. For instance, the connectivity service 122 provides network intelligence to the communication service 120 and the endpoint devices 102. The connectivity service 122 also provides configuration information to the endpoint devices 102, such as to enable the endpoint devices 102 to be configured and reconfigured to account for varying packet quality across the networks 104. The connectivity service 122 maintains a connectivity database (DB) 124 which includes connectivity policies 126 and device records 128. Generally, the connectivity DB 124 is representative of functionality for storing various network parameters and other information pertaining to network connectivity across the networks 104. Examples of different types of network information stored in the connectivity DB 124 are discussed below.

The connectivity policies 126 are representative of different rules and criteria for configuring the endpoint devices 102 for communication. For instance, and as further detailed below, the connectivity policies 126 can indicate different priorities for different instances of the endpoint devices 102, which may affect how and when the endpoint devices 102 are configured and reconfigured for communication across the networks 104. The connectivity policies 126 include individual policies 126a and group policies 126b. The individual policies 126a represent policies that are tailored to individual users and/or devices, such as to specific instances of the endpoint devices 102 and/or individual user profiles. The group policies 126b generally represent policies that are tailored to specific device groups and/or user groups, such as a defined set of the endpoint devices 102. A group for purposes of a group policy 126b can be defined in a variety of ways, such as a user group, an enterprise group, a device type group, a group defined based on user and/or device role, and so forth.

The device records 128 are representative of data that describes different attributes of the endpoint devices 102. In at least some implementations, each of the device records 128 pertains to a different instance of the endpoint devices 102. Examples attributes included in the device records 128 include device identifiers, device types, software types and configurations, hardware types and configurations, and so forth. As further detailed below, the connectivity service 122 can utilize the connectivity policies 126 and the device records 128 to determine whether and/or how to configure different instances of the endpoint devices 102 for communication across the networks 104.

According to various implementations, the connectivity service 122 provides connectivity and configuration data (referred to collectively as "configuration data") from the connectivity DB 124 to the communication service 120, which forwards the configuration data to the endpoint devices 102. The endpoint devices 102 store the configuration data as part of a configuration table 130, and the endpoint devices 102 utilize the configuration data to configure various operational parameters and settings of the endpoint devices 102 for communication across the networks 104. The endpoint devices 102, for instance, are configured for transmission of data across the networks 104 as part of a communication session between different instances of the endpoint devices 102.

In at least some implementations, the connectivity service 122 represents a service that is implemented and managed by the communication service 120. Alternatively, the connectivity service 122 represents a standalone service that provides intelligence pertaining to networks to a variety of different services and/or devices.

To enable various types of communication-related data to be shared between various entities, the endpoint devices 102 include a performance module 132 which is representative of functionality for receiving communication attributes from other entities, and for sharing communication attributes with other entities. According to various implementations, the performance module 132 utilizes a communication application programming interface (API) 134 to enable various communication attributes to be shared. The communication API 134, for example, can be populated with various communication attributes to enable the communication attributes to be shared with various entities involved in communication sessions. Generally, instances of the performance module 132 can be propagated to the various endpoint devices to enable the endpoint devices 102 to participate in sharing communication attributes pertaining to communication sessions.

The different entities and functionalities discussed in the environment 100 may be implemented in software, hardware, firmware, and/or combinations thereof. Further details and implementations of the various entities of the environment 100 are discussed below.

Figure 2:
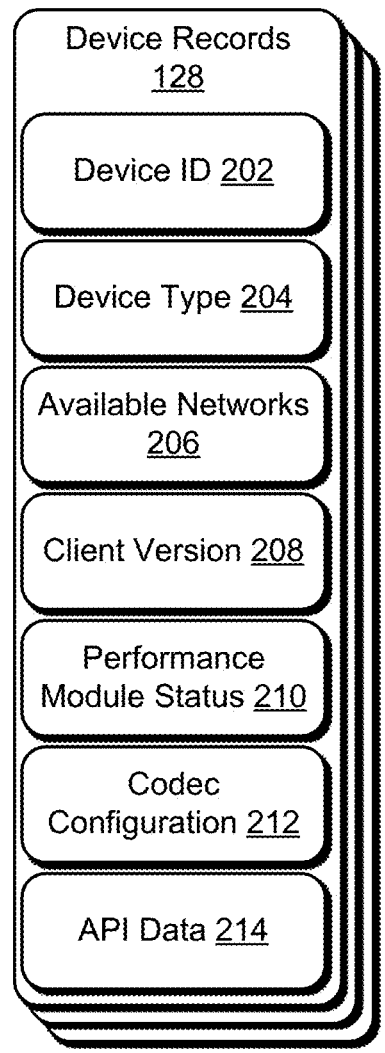
FIG. 2 depicts an example implementation of device records in accordance with one or more implementations.

FIG. 2 depicts an example implementation of the device records 128 in accordance with one or more implementations. Generally, each of the device records 128 corresponds to a respective instance of the endpoint devices 102. The device records 128, for example, each describe different attributes of a different respective instance of the endpoint devices 102, such as:

Device Identifier ("ID") 202: This attribute includes an identifier for a respective endpoint device 102, such as a media access control (MAC) address, an endpoint identifier (EID), an Internet Protocol (IP) address, and so forth.

Device Type 204: This attribute describes a general device type for a respective endpoint device 102, such as a device role and/or form factor for a respective endpoint device 102.

Available Networks 206: This attribute identifies a particular network and/or set of networks that are available to a respective endpoint device 102. The attribute, for example, identifies a network to which a respective endpoint device 102 is connected, and/or a network that is available to the endpoint device 102 for network connectivity, such as a wireless network that is in connectivity range of the endpoint device 102. According to various implementations, the available networks 206 field identifies specific, discrete instances of networks, such as via network identifiers for different networks.

Client Version 208: This attribute identifies a particular version of the communication client 110 that is installed on a respective endpoint device 102. The attribute, for instance, identifies an update status of the communication client 110 on a respective endpoint device 102, such as which version of the communication client 110 from multiple different available versions is installed and/or executable by the respective endpoint device 102.

Performance Module Status 210: This attribute indicates whether the performance module 132 is installed on a respective endpoint device 102 and/or which version of the performance module 132 is installed on the respective endpoint device 102.

Codec Configuration 212: This attribute describes the codec 116 for a respective endpoint device 102, such as a compression standard (e.g., format) utilized by the codec 116, a compression rate (e.g., data rate) used by the codec 116, media that the codec 116 is configured to handle (e.g., audio, video, combinations thereof, and so forth), and so on.

API Data 214: This attribute can be populated with data values aggregated from the communication API 134. For instance, when a respective endpoint device 102 receive data values via the communication API 134 (examples of which are discussed below), the API data 214 can be populated with the data values.

According to various implementations, the different attributes and data values included in a device record 128 are dynamically configurable and reconfigurable, such as based on changes in device state for respective endpoint devices 102.

Having described an example environment in which the techniques described herein may operate, consider now a discussion of example ways of propagating routing awareness in accordance with one or more implementations.

According to various implementations, techniques can be employed to dynamically enlighten various entities with communication attributes, such as information about network conditions, information about communication sessions, and so forth. For instance, the performance module 132 can leverage the communication API 134 to generate notification events that include various attributes of networks and communication sessions. The notification events can be propagated to different entities further to techniques for endpoint configuration for a communication session discussed herein.

In at least some implementations, the communication API 134 can be populated with values for sets of communication attributes based on various network and/or node conditions. Consider, for instance, the following communication attributes that may be conveyed via a notification event generated using the communication API 134.

Network Identifiers: This attribute can be leveraged to identify networks, such as networks that a communication session traverses between an endpoint devices 102 and an endpoint device 102. In at least some implementations, the network identifier may include an autonomous system (AS) number that identifies a particular network. With reference to the environment 100, for instance, the network identifier may identify a particular network included in the networks 104.

Timestamp: This attribute can be leveraged to specify timestamps for a start of a communication session, updates that occur during a communication session, and an end (e.g., termination) of a communication session.

Source IP Address: This attribute can be leveraged to specify an IP address for a device that is a source of media during a communication session, e.g., a device that initiates a communication session. With reference to the environment 100, for instance, the source IP address may be for an endpoint device 102.

Destination IP Address: This attribute can be leveraged to specify an IP address for a device that receives media as part of a communication session. With reference to the environment 100, for instance, a destination IP address may be for an endpoint device 102.

Device Identifier: This attribute can be used to identify source and/or destination devices involved in a communication session using a hardware-specific identifier, such as a media access control (MAC) address and/or other unique hardware identifier.

Transport Type: This attribute can be leveraged to specify a transport type or combination of transport types for a communication session. Examples of transport types include Transmission Control Protocol (TCP), User Datagram Protocol (UDP), and so forth.

Source Port: this attribute can be leveraged to specify an identifier for a port at a source device, e.g., a source device identified by the Source IP Address referenced above.

Destination Port: This attribute can be leveraged to specify an identifier for a port at a destination device, e.g., a destination device identified by the Destination IP Address referenced above.

Media Type: This attribute can be leveraged to specify a media type and/or types that are transmitted and/or are being transmitted as part of a communication session. A communication session can involve multiple different types of media, such as audio, video, images, and combinations thereof. Thus, the Media Type attribute can be employed to identify media types in a communication session.

Bandwidth Estimation: This attribute can be leveraged to specify an estimated bandwidth used for a communication session.

To: This attribute can be leveraged to identify a user to which media in a communication session is transmitted.

From: This attribute can be leveraged to identify a user from which media in a communication session is transmitted.

Codec: This attribute can be leveraged to specify a codec or codecs utilized as part of a communication session.

Subnet: This attribute can be leveraged to identify a subnetwork and/or set of subnetworks that a communication session is originated in and/or traverses.

Personally Identifiable Information (PII): This attribute can be used to specify particular types of PII that are to be included and/or not included with a subscription to communication attributes. For instance, the PII attributes can be used to specify that no PII is to be included in a set of communication attributes. As another example, the PII attributes can be used to specify that a particular set of PII is to be included, whereas a different set of PII is to be excluded.

Error Code: This attribute can be leveraged to specify various error codes for errors that may occur as part of a communication session. For example, errors can include errors that occur during initiation the communication session, errors that occurred during a communication session, errors that occur when a communication session is terminated, and so forth.

Mean Opinion Score (MOS) Degradation: This attribute can be leveraged to specify a MOS for a communication session. The attribute, for instance, can be used to indicate that an overall quality of a communication session has decreased.

Jitter Inter-Arrival Time: This attribute can be leveraged to specify jitter values for a communication session. The attribute, for instance, can be used to indicate that a jitter value or values have increased, e.g., have exceeded a specified jitter value threshold.

Packet Loss Rate: This attribute can be leveraged to specify a packet loss rate for a communication session. The attribute, for instance, can be used to indicate that a packet loss rate has increased, e.g., has exceeded a specified packet loss rate value threshold.

Round Trip Delay (RTD): This attribute can be leveraged to specify RTD values for packets in communication sessions. The attribute, for instance, can be used to indicate that RTD values for packets have increased, e.g., have exceeded a specified RTD value threshold.

Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

These particular attributes are presented for purpose of example only, and it is to be appreciated that a variety of other communication attributes not expressly mentioned herein can be shared according to techniques for endpoint configuration for a communication session. In at least some implementations, attributes can be linked to particular networks and/or network components to characterize performance attributes of the networks and/or network components. Further, an entity that receives values for communication attributes via the communication API 134 can utilize the attributes to improve network and/or communication session performance.

Figure 3:
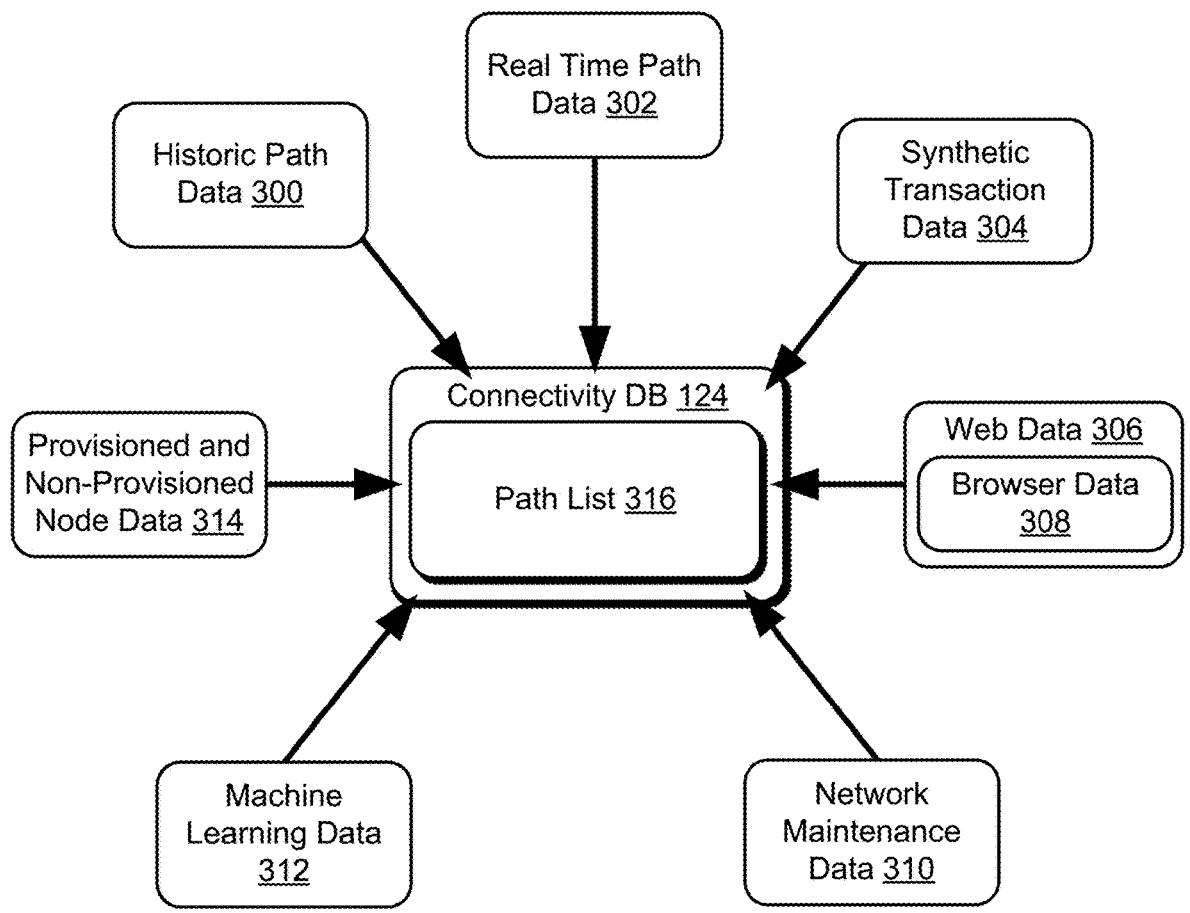
FIG. 3 depicts different sources of communication-related attributes maintained by a connectivity database in accordance with one or more implementations.

FIG. 3 depicts different sources of communication-related attributes maintained by the connectivity DB 124. Generally, a variety of different types of communication-related attributes can be stored for the different sources, examples of which are discussed above with reference to the communication API 134. Example sources for communication-related attributes stored in the connectivity DB 124 include:

Historic Path Data 300: This type of data includes communication-related attributes for network paths and components of network paths (e.g., intermediate nodes, endpoint devices, and so forth) based on historical usage, such as historical (e.g., past) communication sessions that occurred over the paths and network components.

Real Time Path Data 302: This type of data includes communication-related attributes for network paths and components of network paths (e.g., intermediate nodes, endpoint devices, and so forth) based on current, real time usage. The real time path data 302, for example, can be collected from a component of a network path based on a communication session that is in progress over the network path, e.g., in real time while the communication session is active and in progress.

Synthetic Transaction Data 304: This type of data includes communication-related attributes for network paths and components of network paths (e.g., intermediate nodes, endpoint devices, and so forth) based on synthetic transactions that are implemented over the paths.

Web Data 306: This type of data includes communication-related attributes for network paths and components of network paths (e.g., intermediate nodes, endpoint devices, and so forth) based on data collected from different web-based scenarios and transactions that occur over the paths. For instance, the web data 306 includes browser data 308 collected based on data transmitted and/or received by a web browser. One example of the browser data 308 includes round-trip delay time (RTT) data collected by a web browser and/or other web-enabled functionality. According to various implementations, the web data 306 includes data from historical applications and services that were routed through different routing paths.

Network Maintenance Data 310: This type of data includes communication-related attributes for network paths and components of network paths (e.g., intermediate nodes, endpoint devices, and so forth) based on maintenance procedures performed on the components. For instance, if a particular network component malfunctions and is scheduled for a maintenance procedures, the network maintenance data 310 can be updated to indicate that the component is malfunctioning. Thus, when the connectivity service 122 selects a candidate path for a communication session, the malfunctioning component may be excluded. As another example, when a network component is repaired and/or optimized (e.g., updated), the network maintenance data 310 can be updated to indicate that the network component is functioning and/or has improved functionality. Thus, when the connectivity service 122 selects a candidate path for a communication session, the repaired/improved component may be included and/or prioritized for selection for the candidate path.

Machine Learning Data 312: This type of data utilizes machine learning techniques to analyze and characterize attributes of network paths. For instance, one or more of types of communication-related data discussed herein can be aggregated and used to train a predictive model (e.g., a decision tree, a neural network, and so forth) that can then be evaluated to predict performance (e.g., packet quality) of a network node and/or a network path.

Provisioned and Non-Provisioned Node Data 314: This type of data specifies which endpoint devices 102 are provisioned with the performance module 132, and which endpoint devices 102 are not provisioned with the performance module 132. For instance, as detailed herein, an endpoint device 102 that is not provisioned with the performance module 132 can be provisioned, either temporarily or for an extended period of time, with the performance module 132. Generally, provisioning an endpoint device 102 with the performance module 132 enables the endpoint device 102 to participate in attribute sharing behaviors, such as for sharing attributes of network paths, communication sessions, and so forth.

The sources and types of communication-related attributes are presented for purpose of example only, and it is to be appreciated that a variety of other types and sources of communication-related attributes can be utilize according to techniques for endpoint configuration for a communication session described herein.

According to various implementations, these different attributes are used to generate a path list 316 that identifies different routing paths and routing paths attributes for routing data across the networks 104 between the endpoint devices 102. Routing paths can be identified in the path list 316 in various ways, such as via network identifiers for networks along each routing path, identifiers for network nodes along each routing path, a network destination identifier such as a uniform resource identifier (URI), and so forth.

In at least some implementations, the path list 316 indicates packet quality for different routing paths and/or network nodes along different routing paths. Generally, the connectivity service 122 can determine packet quality in various ways, such as via quality-related feedback from endpoints that communicate along different routing paths, via communication of quality information from endpoint devices 102 along different routing paths, via direct detection of packet quality along different routing paths, and so forth. For instance, synthetic transactions can be implemented that test packet quality along different routing paths over the networks 104

Having described an example sources of and ways of propagating communication attributes, consider now some example implementation scenarios for endpoint configuration for a communication session in accordance with one or more implementations.

The following section describes an example implementation scenarios for endpoint configuration for a communication session in accordance with one or more implementations. The implementation scenarios may be implemented in the environment 100 discussed above, and/or any other suitable environment.

Figure 4:
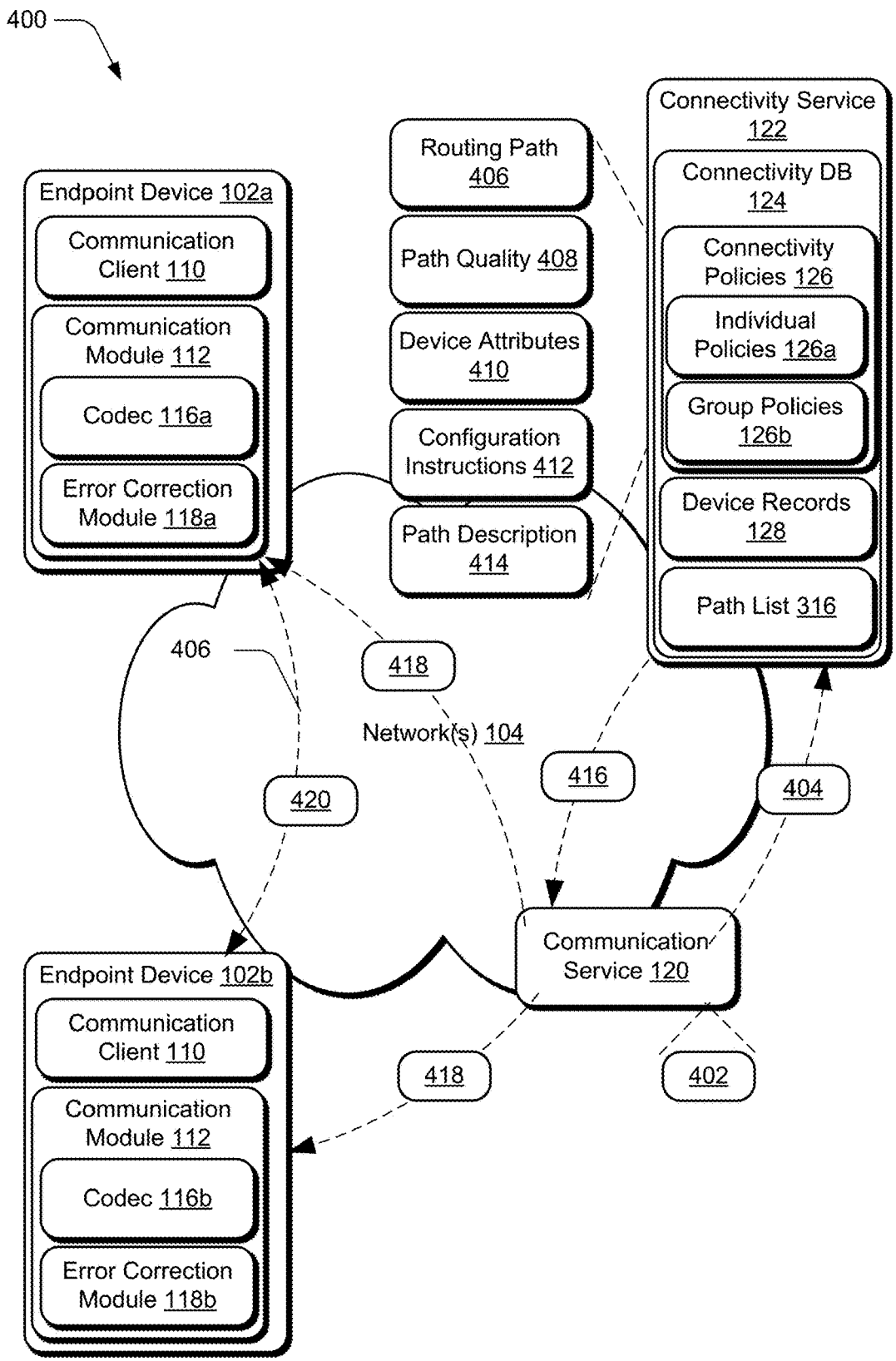
FIG. 4 depicts an example implementation scenario for configuring an endpoint for a communication session in accordance with one or more implementations.

FIG. 4 depicts an example implementation scenario 400 for configuring an endpoint for a communication session in accordance with one or more implementations.

In the scenario 400, the communication service 120 detects a notification event 402 which indicates that a communication session is initiated or is scheduled to be initiated between an endpoint device 102a and an endpoint device 102b. The endpoint devices 102a, 102b, for example, represent instances of the endpoint devices 102. Generally, the notification event 402 can be implemented in various ways. For instance, the notification event 402 can occur in response to detecting that a user of the endpoint device 102a performs an action to initiate a communication session with the endpoint device 102, such as dialing a phone number or selecting a call control functionality to initiate a communication session with the endpoint device 102b.

Alternatively, the notification event 402 can occur in response to detecting an upcoming scheduled communication session. For instance, the communication client 110 on the endpoint device 102a detects a scheduled upcoming calendar event that involves a communication session. Thus, the notification event 402 can occur responsive to a real-time initiation of a communication session, and/or proactively based on a scheduled communication session that has not yet started.

Accordingly, the communication service 120 transmits a routing query 404 to the connectivity service 122. Generally, the routing query 404 includes various information pertaining to the communication session, such as identifiers for the endpoint devices 102a, 102b, media type(s) involved in the communication session, and so forth. In at least some implementations, the routing query 404 is generated using the communication API 134 introduced above.

Based on the routing query 404, the connectivity service 122 determines a routing path for routing the communication session between the endpoint devices 102a, 102b. The connectivity service 122, for example, queries the path list 316, and identifies a routing path 406 that is available for routing data between the endpoint devices 102a, 102b. The connectivity service 122 also determines a path quality 408 of the routing path 406. Generally, the path quality 408 is based on different communication-related attributes, examples of which are discussed throughout. The path quality 408, for example, is based on errors detected in signal across the routing path 406, such as packet error rate (PER), jitter (e.g., packet jitter), packet loss rate, and so forth.

Further to the scenario 400, the connectivity service 122 determines device attributes 410 for the endpoint devices 102a, 102b from respective device records 128 for the endpoint devices 102a, 102b, and uses the device attributes 410 to generate configuration instructions 412. Generally, the configuration instructions 412 indicate how the endpoint device 102a and/or the endpoint device 102b are to be configured for communication across the routing path 406. The configuration instructions 412, for example, can be specific to one of the endpoint devices 102a, 102b, and/or may be generally applicable to both devices.

For instance, consider that the path quality 408 indicates that the routing path 406 meets and/or exceeds a pre-specified error threshold, such as based on an error rate observed across the routing path 406. Accordingly, the configuration instructions 412 specify that codecs 116a, 116b of the endpoint devices 102a, 102b are to be configured to improve quality of a communication session between the devices. The configuration instructions 412, for example, indicate that a current data rate for the codecs 116a, 116b is to be decreased. Generally, decreasing the data rate of the codecs decreases an amount of encoded data that is transmitted over the routing path 406, and thus increases a percentage of encoded data that is received at a receiving device. Accordingly, session quality can be increased by reducing data loss as part of a communication session.

Alternatively or additionally, the configuration instructions 412 can specify that error correction (e.g., FEC) is to be adjusted at the endpoint devices 102a, 102b. For instance, error correction redundancy can be increased to enable errors to be corrected with more accuracy at a receiving device.

As yet another example, the configuration instructions 412 can instruct the endpoint devices 102a, 102b to increase their jitter buffers to account for high jitter values indicated by the path quality 408. Generally, increasing a jitter buffer increases a number of packets that are buffered and are thus available to correct for jitter experienced in incoming packets.

While the path quality 408 may indicate that the routing path 406 exceeds an error threshold, the path quality 408 may alternatively indicate that the routing path 406 is below an error threshold, e.g., to indicate that the routing path 406 has high packet quality. In such a scenario, the configuration instructions 412 can specify that a data rate of the codecs 116a, 116b is to be increased, such as to increase a media quality of media that is encoded by the codecs 116a, 116b. Additionally or alternatively, the configuration instructions 412 can specify that error correction procedures (e.g., FEC, CRC, and so forth) can be decreased, such as to conserve device and/or network resources.

These examples of the configuration instructions 412 are presented for purpose of example only, and it is to be appreciated that the configuration instructions 412 can include various other types of configuration information to enable optimization of communication session and/or network performance.

In at least some implementations, the configuration instructions 412 may specify general configuration settings to be applied across multiple endpoint devices 102, e.g., at the endpoint devices 102a, 102b. For instance, the endpoint devices 102a, 102b may be included in a group defined for a group policy 126b. Thus, the group policy 126b can be applied based on the path quality 408 to generate the configuration instructions 412 to be applied across a group of devices including the endpoint devices 102a, 102b.

Alternatively or additionally, the configuration instructions 412 may include device-specific instructions. For instance, a particular individual policy 126a may be defined that applies to the endpoint device 102a but not to the endpoint device 102b. Thus, based on the particular individual policy 126a, the configuration instructions 412 can include a first setting to be applied by the endpoint device 102a but not the endpoint device 102b. Further, a different individual policy 126a may apply to the endpoint device 102b such that the configuration instructions 412 include a second setting to be applied by the endpoint device 102b but not the endpoint device 102a. Thus, implementations discussed herein enable customized configurations to be generated for groups and individual devices to improve communication session performance.

As an additional or alternative implementation to directing a certain action or set of actions such as configuring a codec 116 and/or an error correction module 118, the configuration instructions 412 may identify a packet quality across the routing path 406. For instance, the configuration instructions 412 can specify an average PER, an average jitter value, an average RTD, and/or other packet quality indicator across the routing path 406. Thus, an endpoint device 102 that receives the configuration instructions 412 can utilize the indication of packet quality to determine whether and/or how to configure itself for communication across the routing path 406.

Continuing with the scenario 400, the connectivity service 122 communicates a query response 416 that includes a path description 414 and the configuration instructions 412 to the communication service 120. Generally, the path description 414 identifies the routing path 406, such as by identifying network nodes along the routing path 406, networks 104 along the routing path 406, and so forth. The communication service 120 forwards a session notification 418 that includes the path description 414 and the configuration instructions 412 to the endpoint devices 102a, 102b, and the endpoint devices 102a, 102b utilize the configuration instructions 412 to configure themselves for a communication session across the routing path 406. The endpoint devices 102a, 102b, for example, configure their respective codecs 116a, 116b based on the configuration instructions 412. Alternatively or additionally, the endpoint devices 102a, 102b configure their respective error correction modules 118a, 118b based on the configuration instructions 412.

As mentioned above, the configuration instructions 412 may dictate specific settings to be applied by the endpoint devices 102a, 102b. Alternatively or additionally, the configuration instructions 412 can identify a packet quality across the routing path 406. An endpoint device 102, for example, can configure itself based on the indication of packet quality. For instance, the communication client 110 and/or the communication module 112 can execute decision logic to determine how to configure the endpoint device 102, such as how to configure the codec 116 and/or the error correction module 118.

Accordingly, the endpoint devices 102a, 102b exchange communication media with each other via a communication session 420 over the routing path 406. For instance, based on the path description 414, the endpoint devices 102a, 102b route media data of the communication session 420 over the routing path 406. Further, the codecs 116a, 116b and/or the error correction modules 118a, 118b operate according to the configuration instructions 412 to encode and decode media data of the communication session 420, and/or to apply error correction to the media data.

In at least some implementations, the configuration instructions 412 are generated by the connectivity service 122 and applied by the endpoint devices 102 before the communication session 420 is initiated. For instance, the configuration instructions 412 are generated and applied proactively to attempt to increase session quality of the communication session 420 prior to start of the communication session 420.

Alternatively or additionally, the configuration instructions 412 are generated and applied after the communication session 420 has started. For instance, the communication session 420 may be initiated over the routing path 406. Concurrently and/or after initiation of the communication session 420, the connectivity service 122 determines the path quality 408 of the routing path 406, and generates the configuration instructions 412. The connectivity service 122 then communicates the configuration instructions 412 to the communication service 120, which forwards the configuration instructions 412 to the endpoint devices 102a, 102b. The endpoint devices 102a, 102b can then apply the configuration instructions 412, such as to reconfigure settings of the endpoint devices 102a, 102b after the communication session 420 is initiated. Thus, in at least some implementations, the configuration instructions 412 can be generated and/or applied after the communication session 420 is initiated to improve session quality of the communication session 420.

According to one or more implementations, the configuration instructions 412 are generated based on the connectivity policies 126. For instance, consider that the connectivity policies 126 indicate that the endpoint device 102a is a higher priority device than the endpoint device 102b. Generally, priority of an endpoint device 102 may be determined in various ways, such as based on user priority, location priority (e.g., geographic location of an endpoint device 102), role priority, and so forth. Based on the connectivity policies 126 indicating that the endpoint device 102a is a higher priority device, the endpoint device 102a is afforded a higher weighting value than the endpoint device 102b in generating the configuration instructions 412.

Consider, for example, that the connectivity service 122 determines that based on poor path quality 408, the codec 116b of the endpoint device 102b is to be reconfigured. For instance, a data rate of the codec 116b is to be reduced to account for poor packet quality across the routing path 406. However, reducing the data rate of the codec 116b may reduce a media quality experienced at the endpoint device 102a as part of the communication session 420. Accordingly, since the endpoint device 102a is weighted higher than the endpoint device 102b, the configuration instructions 412 are generated to not include an indication that the data rate of the codec 116b is to be reduced. Media quality at the endpoint device 102a is thus given a higher priority than media quality at the endpoint device 102b, and thus the configuration instructions 412 are generated to prioritize media quality at the endpoint device 102a over media quality at the endpoint device 102b.

According to various implementations, techniques for endpoint configuration for a communication session can be employed to attempt to prevent degradation in session quality during a communication session. Consider, for example, the following scenario.

Figure 5:
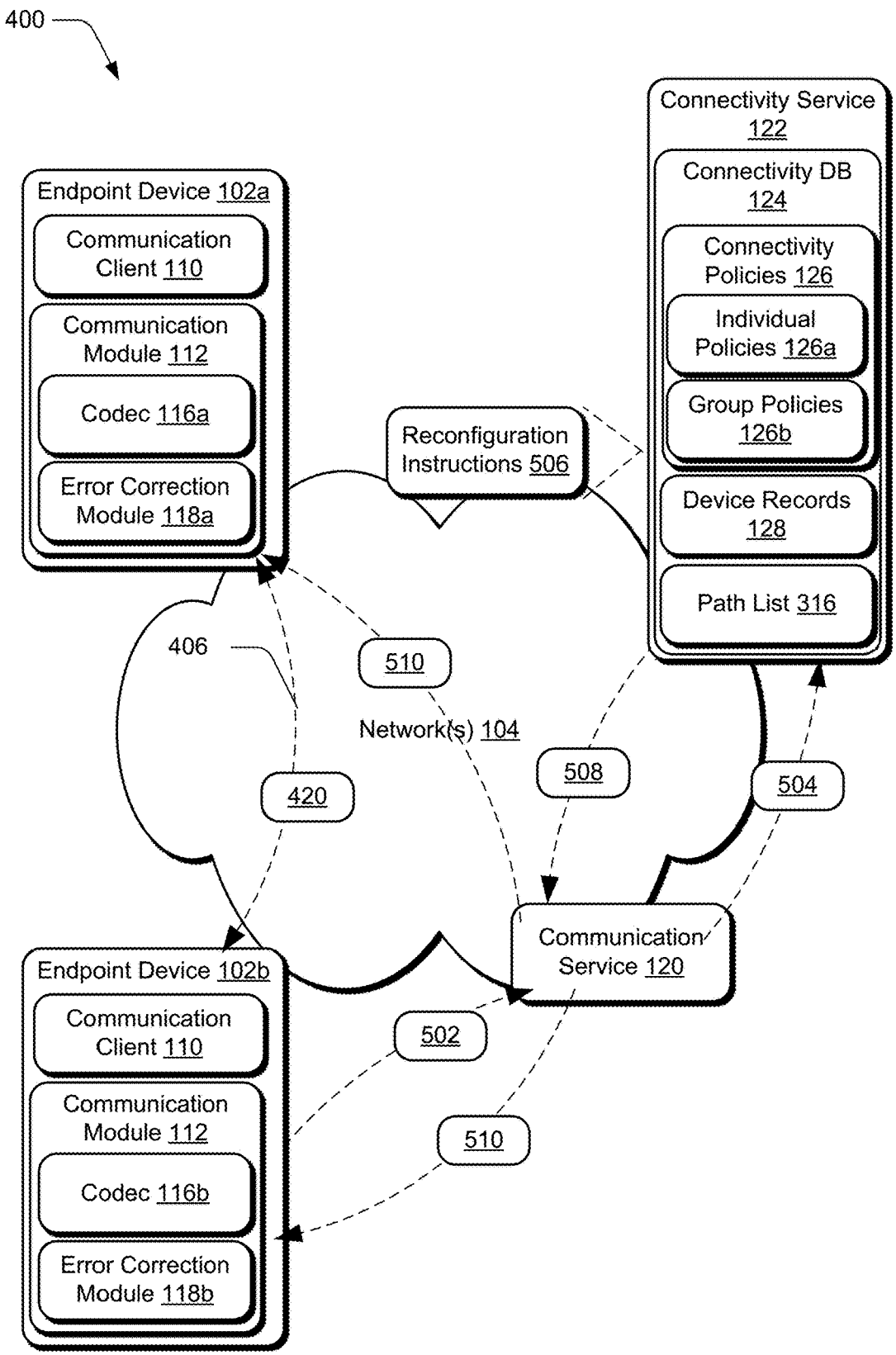
FIG. 5 depicts an example implementation scenario for endpoint reconfiguration based on a packet quality trend in accordance with one or more implementations.

FIG. 5 depicts an example implementation scenario 500 for endpoint reconfiguration based on a packet quality trend in accordance with one or more implementations. The scenario 500, for instance, represents a continuation and/or variation of the scenario 400 described above.

In the scenario 500, the communication session 420 is in progress and the endpoint devices 102a, 102b are configured based on the configuration instructions 412. While the communication session 420 is in progress, the communication service 120 detects a change in packet quality for the communication session 420 across the routing path 406. The communication service 120, for example, receives a quality notification 502 from the endpoint device 102a indicating that packet quality for the communication session 420 is decreasing. For instance, a communication client 110a of the endpoint device 102a detects an increase in errors while the communication session 420 proceeds, such as increasing packet errors, increasing jitter, and so on. Accordingly, a performance module 132a generates the quality notification 502 by populating values to attributes of the communication API 134a, examples of which are detailed above. The endpoint device 102a then communicates the quality notification 502 to the communication service 120.

Based on the quality notification 502, the communication service 120 communicates a configuration query 504 to the connectivity service 122. Generally, the configuration query 504 identifies the endpoint devices 102a, 102b, the routing path 406, and indicates that a quality trend is occurring over the routing path 406. The configuration query 504, for example, indicates that an increasing error trend is occurring over the routing path 406, such as based on increasing PER, increasing packet loss, increasing jitter, and so forth.

Accordingly, the connectivity service 122 determines that the endpoint devices 102a, 102b are to be reconfigured based on the increasing error trend. For instance, the connectivity service 122 determines that the codecs 116a, 116b are to be reconfigured, such as by decreasing their respective data rates. Alternatively or additionally, the connectivity service 122 determines that the error correction modules 118a, 118b are to be reconfigured, such as by increasing their error correction redundancy, increasing their data interleaving depth, and so forth. The connectivity service 122 then generates reconfiguration instructions 506 that indicate how the endpoint devices 102a, 102b are to be reconfigured to attempt to improve performance of the communication session 420 and in response to the increasing error trend.

In at least some implementations, the reconfiguration instructions 506 may specify general reconfiguration settings to be applied across multiple endpoint devices 102, e.g., at the endpoint devices 102a, 102b. Alternatively or additionally, the reconfiguration instructions 506 may include device-specific instructions. For instance, the reconfiguration instructions 506 can include a first setting to be applied by the endpoint device 102a but not the endpoint device 102b, and a second setting to be applied by the endpoint device 102b but not the endpoint device 102a. Thus, implementations discussed herein enable customized reconfigurations to be generated for individual devices to improve communication session performance.

Further to the scenario 500, the connectivity service 122 communicates a configuration response 508 that includes the reconfiguration instructions 506 to the communication service 120, which forwards the reconfiguration instructions 506 to the endpoint devices 102a, 102b via a configuration notification 510. The endpoint devices 102a, 102b utilize the reconfiguration instructions 506 to reconfigure themselves, such as to change settings that were applied based on the configuration instructions 412 described in the previous scenario. The endpoint devices 102a, 102b, for example, reconfigure their respective codecs 116a, 116b based on the reconfiguration instructions 506. Alternatively or additionally, the endpoint devices 102a, 102b reconfigure their respective error correction modules 118a, 118b based on the reconfiguration instructions 506.

Accordingly, the communication session 420 continues across the routing path 406, and the endpoint devices 102a, 102b transmit, receive, and process data of the communication session 420 based on their reconfigured settings applied in response to the reconfiguration instructions 506. Thus, the endpoint devices 102a, 102b can be reconfigured in response to a detected error trend, such as to attempt to reduce the likelihood that data errors will occur in media data of the communication session 420.

While the scenario 500 is discussed with reference to a trend of increasing errors, a trend of decreasing errors may also be detected and used to reconfigure the endpoint devices 102. For instance, consider an alternative implementation where the endpoint device 102a detects a trend of decreasing errors in the communication session 420 and thus the quality notification 502 indicates this decreasing error trend. Accordingly, the configuration query 504 identifies the trend of decreasing errors and the connectivity service 122 generates the reconfiguration instructions 506 based on this decreasing error trend. For instance, the reconfiguration instructions 506 are generated to increase media quality of the communication session 420, such as by indicating that data rate of the codecs 116a, 116b is to be increased.

Alternatively or additionally, the reconfiguration instructions 506 can specify that the error correction modules 118a, 118b are to decrease the amount of error correction that is applied to the communication session 420, such as by decreasing their error correction redundancy, decreasing interleaving depth, and so forth. In at least some implementations, decreasing applied error correction can conserve device resources such as processor bandwidth and battery. Further, decreasing applied error correction can conserve network usage, such as by decreasing an amount of data that is transmitted as part of the communication session 420.

In at least some implementations, the reconfiguration instructions 506 are generated based on the connectivity policies 126. For instance, as mentioned above, the connectivity policies 126 may indicate that the endpoint device 102a is a higher priority device than the endpoint device 102b. Thus, in such a scenario, endpoint device 102a is weighted higher than the endpoint device 102b in determining whether and how to reconfigure the endpoint devices 102a, 102b.

Consider, for example, that in response to the configuration query 504, the connectivity service 122 determines two possible reconfigurations of the endpoint devices 102a, 102b. A first reconfiguration would improve quality of the communication session 420 at the endpoint device 102a but not the endpoint device 102b, and a second reconfiguration would improve quality of the communication session 420 at the endpoint device 102b but not the endpoint device 102a. Since the connectivity policies 126 indicate that the endpoint device 102a is a higher priority device, the connectivity service 122 generates the reconfiguration instructions 506 using the first reconfiguration. Thus, when the reconfiguration instructions 506 are applied by the endpoint device 102a and/or the endpoint device 102b, session quality for the communication session 420 may be improved (e.g., increased) at the endpoint device 102a, but not necessarily at the endpoint device 102b. For instance, the endpoint device 102a may observe a greater reduction in data errors for the communication session 420 than does the endpoint device 102b.

While implementations are discussed herein with reference to the communication service 120 serving as an intermediary between the connectivity service 122 and the endpoint devices 102, it is to be appreciated that in at least some implementations, direct communication can occur between the connectivity service 122 and the endpoint devices 102, such as to enable path information, configuration information, and reconfiguration information to be directly communicated from the connectivity service 122 to the endpoint devices 102.

Thus, techniques for endpoint configuration for a communication session enable endpoint devices to be configured proactively and dynamically to improve communication session and network performance between the devices.

Having discussed some example implementation scenarios, consider now a discussion of some example procedures in accordance with one or more implementations.

The following discussion describes some example procedures for endpoint configuration for a communication session in accordance with one or more implementations. The example procedures may be employed in the environment 100 of FIG. 1, the system 1200 of FIG. 12, and/or any other suitable environment. The procedures, for instance, represent procedures for implementing aspects of the example implementation scenarios discussed above. In at least some implementations, the steps described for the various procedures can be implemented automatically and independent of user interaction.

Figure 6:
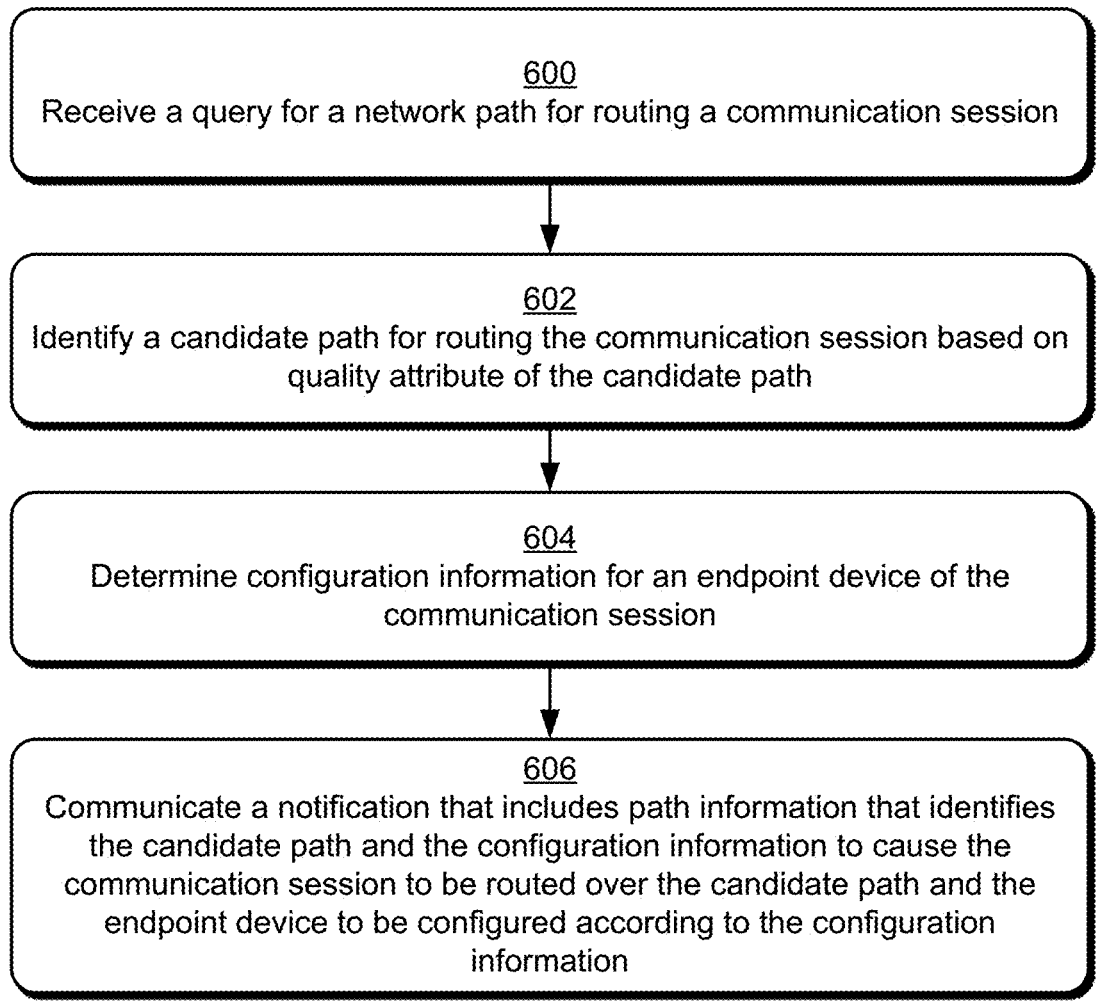
FIG. 6 is a flow diagram that describes steps in a method for providing path information and configuration information for configuring an endpoint device for a communication session in accordance with one or more implementations.

FIG. 6 is a flow diagram that describes steps in a method in accordance with one or more implementations. The method describes an example procedure for providing path information and configuration information for configuring an endpoint device for a communication session in accordance with one or more implementations. In at least some implementations, the method is performed at a network-based service, such as at the communication service 120 and/or the connectivity service 122.

Step 600 receives a query for a network path for routing a communication session. The connectivity service 122, for example, receives a query from the communication service 120 and/or the endpoint devices 102a, 102b for a routing path for routing a communication session. The query may include various types of information, such as identifiers for the endpoint devices 102a, 102b and/or media type(s) to be included in the communication session.

Step 602 identifies a candidate path for routing the communication session based on quality attribute of the candidate path. The connectivity service 122, for example, searches the path list 316 for a candidate routing path with sufficient packet quality for routing the communication session between the endpoint devices 102a, 102b. As discussed above, the path list 316 identifies different routing paths and quality attributes for the routing paths.

Examples of quality attributes include packet quality, signal strength, error periodicity (e.g., whether errors in the signal are bursty or random), and so forth. Generally, a packet quality of a data stream can be determined in various ways. For instance, the packet quality can be determined based on an error rate (e.g., a bit error rate) detected as part of forward error correction (FEC) decoding. In at least some implementations, for example, an error threshold can be defined, such as a threshold PER, a threshold jitter value, a threshold RTD, and so forth. Thus, a data stream that exceeds the error threshold can be characterized as having an error condition, e.g., poor packet quality. A data stream that does not exceed the threshold error rate can be characterized as having an acceptable and/or good packet quality, e.g., as not having an error condition.

Additionally or alternatively, packet quality can be determined based on average receive power for the signal. For instance, a data signal that has an average receive power that exceeds a threshold receive power can be characterized as having an acceptable packet quality. However, a data signal that has an average receive power that does not exceed the threshold receive power can be characterized as having a poor packet quality.

Step 604 determines configuration information for an endpoint device of the communication session. In one or more implementations, the configuration information specifies a setting to be applied on the endpoint device, such as a setting for a codec of the endpoint device, a setting for an error correction functionality of the endpoint device, and so forth. Examples of different error correction functionalities include an FEC module, a cyclic redundancy check (CRC) module, a jitter buffer, and so forth.

As mentioned previously, the connectivity service 122 maintains device records 128 that specify various attributes of endpoint devices 102, such as codec configurations on different endpoint devices 102. Thus, the connectivity service 122 can determine that based on a packet quality of the candidate path, the endpoint device is to be configured to attempt to improve packet quality for the communication session. According to various implementations, optimizing packet quality includes reducing data errors and/or increasing media resolution in media data of a communication session.

Alternatively or additionally to the configuration instructions specifying a particular configuration to be applied at and endpoint device 102, the configuration instructions can include packet quality information across the identified routing path. An endpoint device 102 that receives the packet quality information can determine how to configure itself based on the packet quality. Thus, an endpoint device 102 can be configured based on a specific device configuration (e.g., device setting) determined by the connectivity service 122, based on decision logic performed locally on the endpoint device 102 using packet quality information, and/or a combination of both.

According to various implementations, configuration instructions can be generated based on the connectivity policies 126. For instance, the configuration instructions can be customized for an individual endpoint device 102 based on an individual policy 126a, and/or can be customized for a group of endpoint devices 102 based on a group policy 126b. Consider, for example, a scenario where the connectivity service 122 generates configuration instructions based on a group policy 126b. In such a scenario, the connectivity service 122 can apply the group policy 126b to a set of endpoint devices 102 based on applicable communication modalities. For example, a company-wide meeting traversing overlapping network paths with a Cloud PBX video call can configure the endpoint devices 102 on the PBX video calls to reduce their codec rates, such as from 64 kilobits per second (kbps) for audio and 2 Megabits per second (Mbps) for video to 16 kbps for audio and 512 kbps for video. Thus, configuration instructions can be generated based on an individual policy 126a, a group policy 126b, and/or a combination of both.

Step 606 communicates a notification that includes path information that identifies the candidate path and the configuration information to cause the communication session to be routed over the candidate path and the endpoint device to be configured according to the configuration information. For instance, the connectivity service 122 communicates a notification to the communication service 120 that identifies the candidate path, such as via identifiers for individual endpoint devices 102 along the candidate path and/or identifiers for networks 104 along the candidate path. Further, the notification includes the configuration information, such as a codec rate, an instruction to increase error correction, an instruction to increase a jitter buffer size, an indication of path quality, and so forth. As detailed elsewhere herein, this causes the communication session to be routed over the candidate path and the configuration information to be applied at an endpoint device and/or set of endpoint devices to attempt to improve media quality for a communication session.

Figure 7:
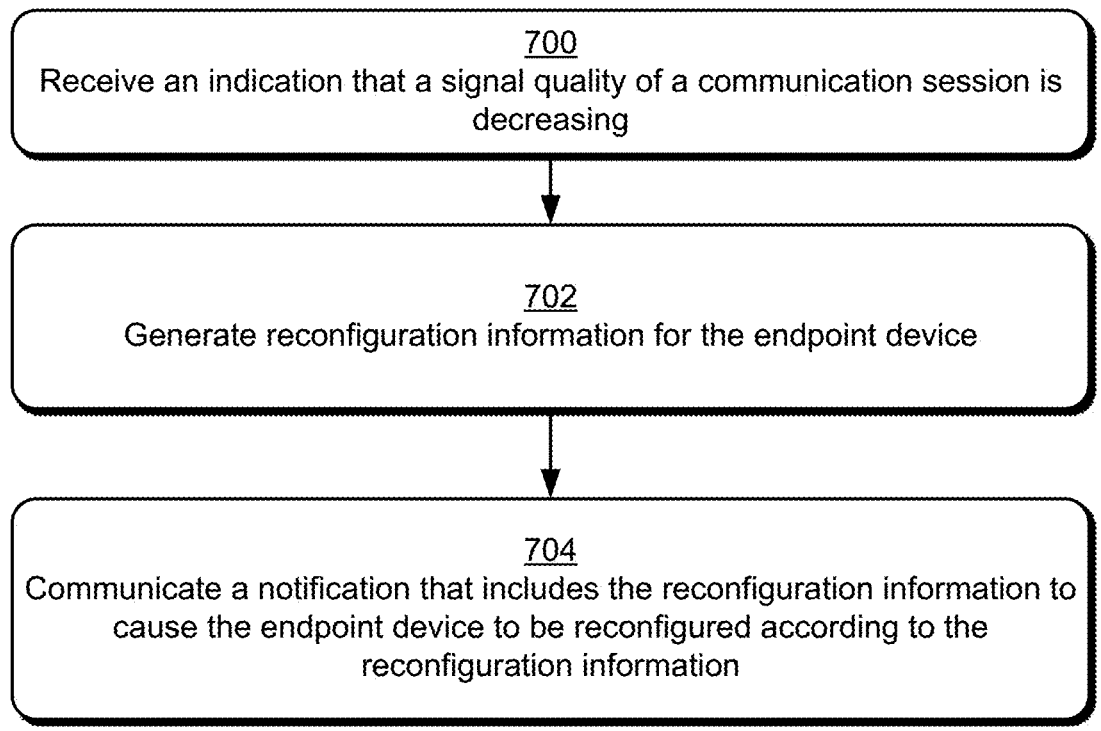
FIG. 7 is a flow diagram that describes steps in a method for generating reconfiguration instructions based on a change in packet quality in accordance with one or more implementations.

FIG. 7 is a flow diagram that describes steps in a method in accordance with one or more implementations. The method describes an example procedure for generating reconfiguration instructions based on a change in packet quality in accordance with one or more implementations. In at least some implementations, the method is performed at a network-based service, such as at the communication service 120 and/or the connectivity service 122.

Step 700 receives an indication that a packet quality of a communication session is decreasing. The connectivity service 122, for example, receives a notification from the communication service 120 and/or an endpoint device 102 indicating that a packet quality of a communication session is increasing. The indication of decreasing packet quality may take various forms, such as an indication of increasing PER, an indication of increasing numbers of dropped packets, increasing jitter experienced at an endpoint device 102, and so forth.

Step 702 generates reconfiguration information for the endpoint device. The reconfiguration information, for instance, specifies an updated setting for a codec of an endpoint device or an updated setting for an error correction functionality of the endpoint device. Alternatively or additionally, the reconfiguration information specifies an indication of packet quality of a routing path of the communication session. The connectivity service 122, for instance, generates the reconfiguration information to be applied by an endpoint device 102 to attempt to mitigate an effect of the decreasing packet quality on the packet quality of the communication session. Examples of different reconfiguration information are discussed throughout this disclosure, and include settings such as changing a data rate of a codec, increasing error correction of an error correction functionality, changing a size of a jitter buffer, and so forth.

According to various implementations, reconfiguration information can be generated based on the connectivity policies 126. For instance, the reconfiguration information can be customized for an individual endpoint device 102 based on an individual policy 126a, and/or can be customized for a group of endpoint devices 102 based on a group policy 126b.

Step 704 communicates a notification that includes the reconfiguration information to cause the endpoint device to be reconfigured according to the reconfiguration information. For example, the connectivity service 122 communicates the notification to the communication service 120 and/or an endpoint device 102 to cause the configuration information to be applied by the endpoint device.

According to various implementations, this method may be applied dynamically during a communication session to make real-time adjustments to endpoint devices and to mitigate an effect of decreasing packet quality on media quality of the communication session.

Figure 8:
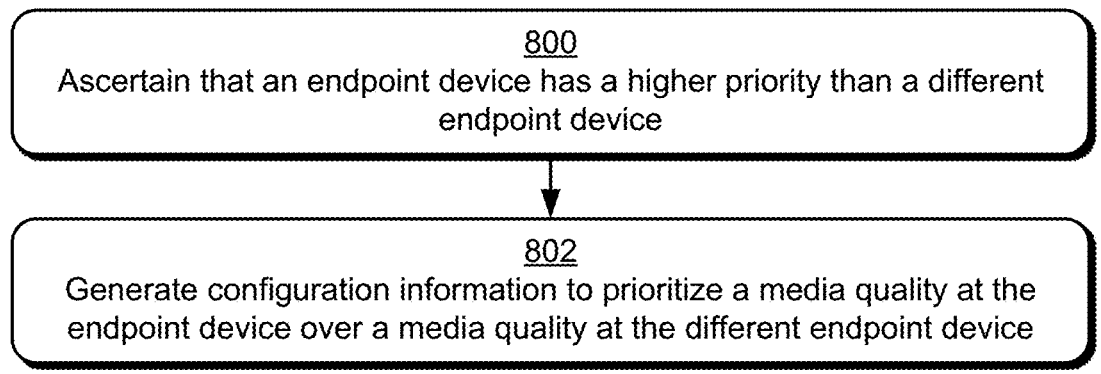
FIG. 8 is a flow diagram that describes steps in a method for generating configuration instructions based on priority in accordance with one or more implementations.

FIG. 8 is a flow diagram that describes steps in a method in accordance with one or more implementations. The method describes an example procedure for generating configuration instructions based on priority in accordance with one or more implementations. In at least some implementations, the method is performed at a network-based service, such as at the communication service 120 and/or the connectivity service 122.

Step 800 ascertains that an endpoint device has a higher priority than a different endpoint device. Endpoint device priority, for instance, is specified by the connectivity policies 126, such as by an individual policy 126a and/or a group policy 126b. Generally, endpoint device priority can be based on different factors, such as:

Device user priority—some users may be identified as having a higher priority than other users. For instance, a chief executive officer of a corporation may be specified as a higher priority user than an employee of the corporation.

Location priority—some device locations (e.g., a geographic location of an endpoint device) may be consider higher priority locations. For instance, a device located at corporate headquarters may be consider a higher priority device than a device located at a branch office.

Role priority—endpoint devices may be associated with different roles, such as roles that are specific to a communication session. For instance, a communication session may be implemented for purpose of a meeting. Thus, an endpoint device associated with an organizer of the meeting may have a higher priority than an endpoint device associated with a standard meeting participant. As another example, a user that is an active participant in a communication session may have a higher priority than a less active user.

These example ways of determining priority are presented for purpose of example only, and it is to be appreciated that endpoint device priority may be determined in a variety of different ways including ways not specifically mentioned herein.

Step 802 generates configuration information to prioritize a media quality at the endpoint device over a media quality at the different endpoint device. For instance, consider that the connectivity service 122 determines that based on a packet quality across a routing path, several configuration options are available. A first configuration option would likely increase packet quality at a lower priority endpoint device but would also likely decrease packet quality at a higher priority endpoint device. Further, a second configuration option would likely increase packet quality at the higher endpoint device but may decrease (or not affect) packet quality the lower priority endpoint device. Accordingly, the connectivity service 122 selects the second configuration option for the configuration information to prioritize media quality at the higher priority endpoint device over media quality at the lower priority endpoint device.

While this method is discussed with reference to configuration information, it is to be appreciated that the method may also be utilized to generate reconfiguration information, such as while a communication session is in progress. The method, for example, may be applied dynamically to reconfigure endpoint devices in response to changes in packet quality across a routing path.

Figure 9:
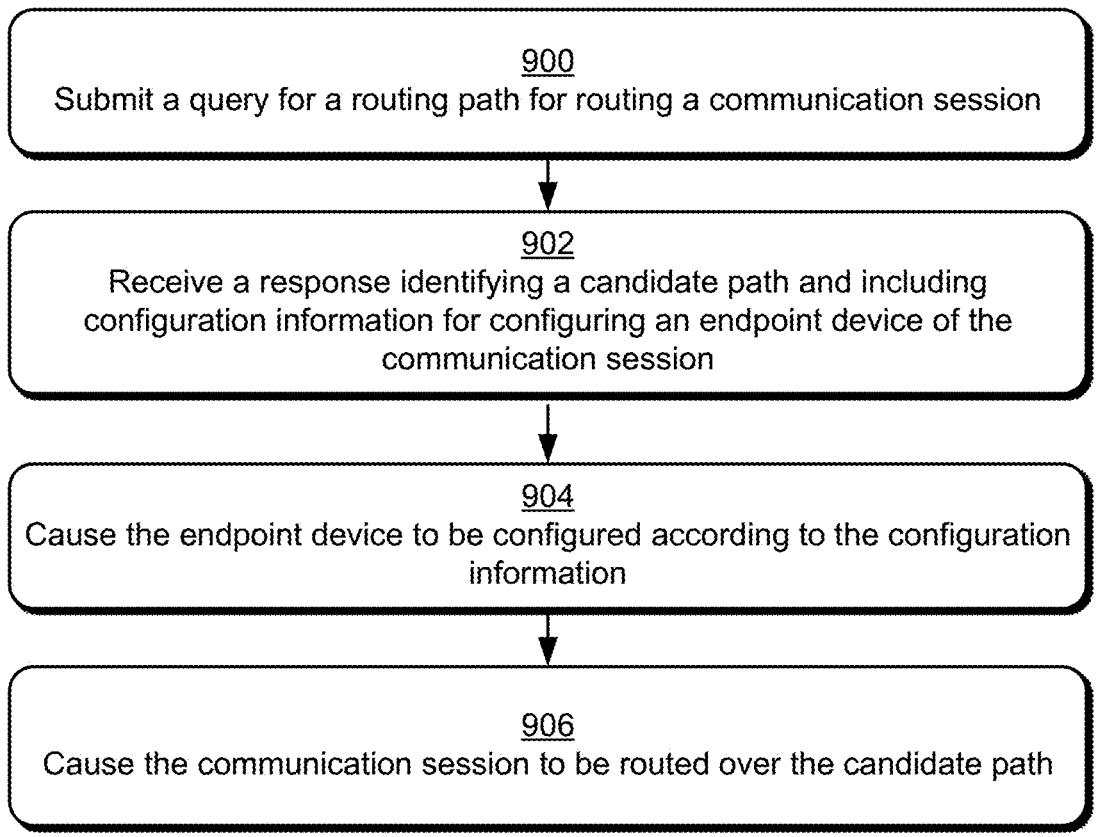
FIG. 9 is a flow diagram that describes steps in a method for enabling an endpoint device to be configured for a communication session in accordance with one or more implementations.

FIG. 9 is a flow diagram that describes steps in a method in accordance with one or more implementations. The method describes an example procedure for enabling an endpoint device to be configured for a communication session in accordance with one or more implementations. In at least some implementations, the method is performed at a network-based service, such as at the communication service 120 and/or the connectivity service 122.

Step 900 submits a query for a routing path for routing a communication session. For example, an endpoint device 102 and/or the communication service 120 queries the connectivity service 122 for a routing path for routing a communication session. Generally, the query includes various types of information pertaining to the communication session, such as identifiers for endpoint devices 102, media type(s), priority information, and so forth. In at least some implementations, the query is formatted using the communication API 134, such as with attributes and values described above for the communication API 134.

Step 902 receives a response identifying a candidate path and including configuration information for configuring an endpoint device of the communication session. An endpoint device 102 and/or the communication service 120, for instance, receives a query response from the connectivity service 122. The query response identifies the candidate path, such as via identifiers for network nodes and/or networks along the candidate path. In at least some implementations, the configuration information includes one or more of a setting for a codec of the endpoint device or a setting for an error correction functionality of the endpoint device. Alternatively or additionally, the configuration information includes an indication path quality, such as an indication of packet errors across the candidate path.

Step 904 causes the endpoint device to be configured according to the configuration information. The communication service 120, for instance, communicates the configuration information to an endpoint device 102, which configures itself using the configuration information.

Step 906 causes the communication session to be routed over the candidate path. For example, an endpoint device 102 utilizes routing information for the candidate path to route data of the communication session over the candidate path.

Figure 10:
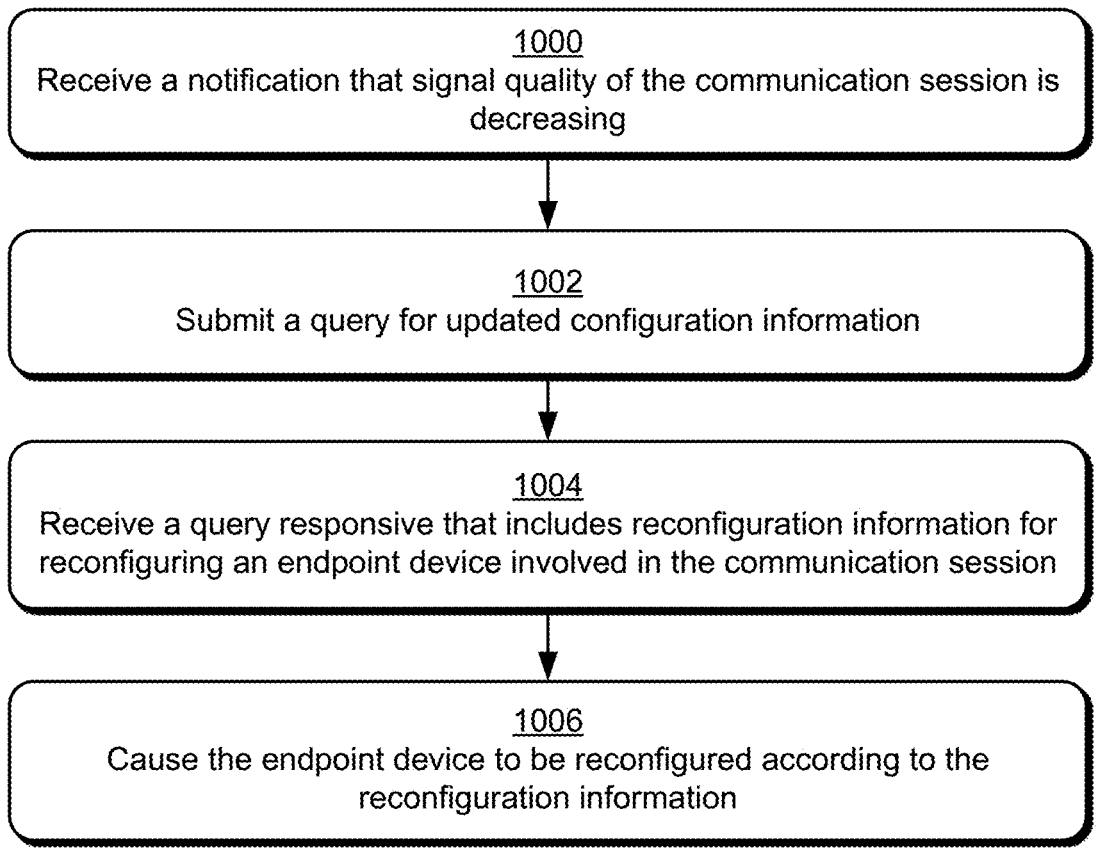
FIG. 10 is a flow diagram that describes steps in a method for retrieving reconfiguration information in accordance with one or more implementations.

FIG. 10 is a flow diagram that describes steps in a method in accordance with one or more implementations. The method describes an example procedure for retrieving reconfiguration information in accordance with one or more implementations. In at least some implementations, the method is performed at a network-based service such as at the communication service 120, and/or at an endpoint device.

Step 1000 receives a notification that packet quality of a communication session is decreasing. An endpoint device 102 involved in the communication session, for example, detects a trend of decreasing packet quality as part of a communication session. Generally, such detection can be performed by various functionalities, such as the communication client 110 and/or the performance module 132. Further, the trend may be detected in various ways, such as via an increase in error rate and/or error count over time.

Step 1002 submits a query for updated configuration information. The communication service 120 and/or an endpoint device 102, for example, queries the connectivity service 122 for updated configuration information. The query may include various types of information, such as identifiers for endpoint devices involved in the communication session, an identifier for a network path being used for the communication session, information describing a packet quality trend (e.g., what is observed to indicate a decrease in packet quality), and so forth.

Step 1004 receives a query responsive that includes reconfiguration information for reconfiguring an endpoint device involved in the communication session. The communication service 120, for example, receives the query response from the connectivity service 122 and forwards the query response to an endpoint device 102. Alternatively or additionally, an endpoint device 102 receives the query response directly from the connectivity service 122. As described herein, the reconfiguration information can include various types of information, such as an updated setting of a codec, an updated setting of an error correction functionality, an indication of signal quality of a routing path, and so forth.

Step 1006 causes the endpoint device to be reconfigured according to the reconfiguration information. An endpoint device 102 involved in the communication session, for example, reconfigures itself based on the reconfiguration information, such as to change a codec setting, an error correction setting, and so forth.

Figure 11:
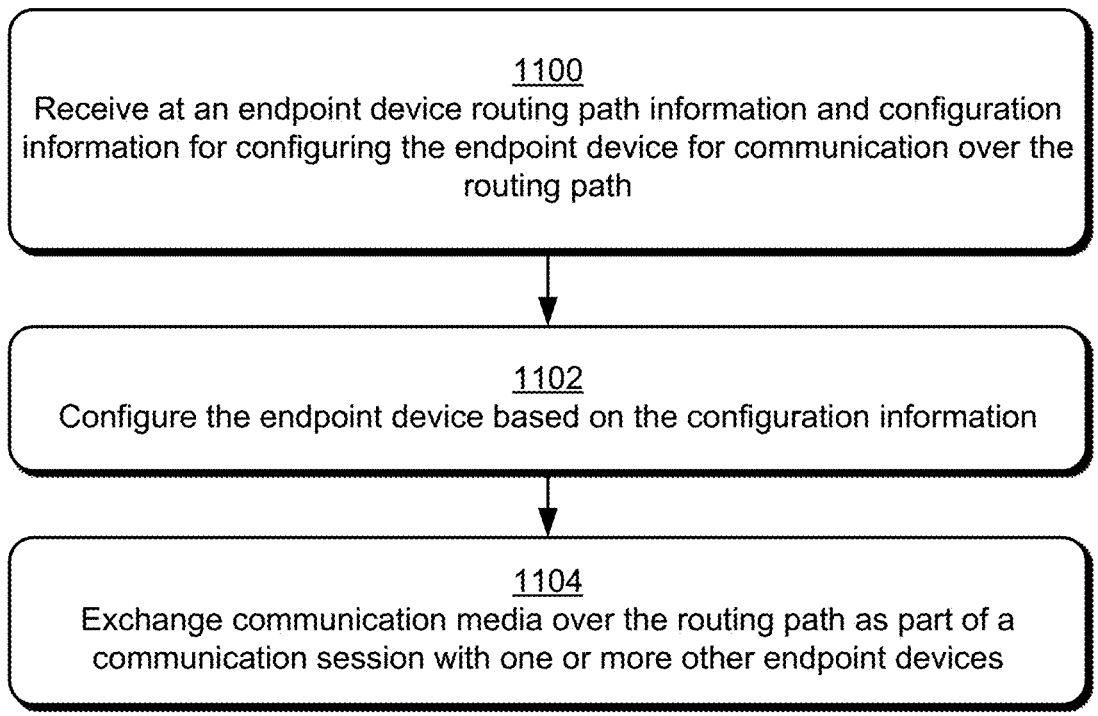
FIG. 11 is a flow diagram that describes steps in a method for configuring an endpoint device for a communication session in accordance with one or more implementations.

FIG. 11 is a flow diagram that describes steps in a method in accordance with one or more implementations. The method describes an example procedure for configuring an endpoint device for a communication session in accordance with one or more implementations. In at least some implementations, the method is performed at endpoint device.

Step 1100 receives at an endpoint device routing path information and configuration information for configuring the endpoint device for communication over the routing path. An endpoint device 102, for example, receives information describing a routing path and configuration information, such as from the communication service 120 and/or the connectivity service 122. The configuration information can include various types of information, such as settings for a codec 116 and/or an error correction module 118, an indication of path quality, and so forth.

Step 1102 configures the endpoint device based on the configuration information. For instance, an endpoint device 102 applies the configuration information to change a setting of the codec 116 and/or a setting of the error correction module 118. Examples ways of changing such settings are described throughout this disclosure.

Alternatively or additionally, the endpoint device 102 uses path quality information to ascertain how to configure itself. For instance, the communication client 110 and/or the communication module 112 determines, based on an indication of path quality, how to configure the endpoint device 102. Thus, endpoint configuration may be based on prescriptive instructions generated by a remote entity such as the connectivity service 122, and/or based on instructions generated locally on an endpoint device 102 using an indication of path quality.

Step 1104 exchanges communication media over the routing path as part of a communication session with one or more other endpoint devices. An endpoint device 102, for example, participates in a communication session with other endpoint devices 102. Further, the endpoint device 102 processes data of the communication session using the codec and/or the error correction functionality that are configured according to the configuration information.

Accordingly, implementations discussed herein enable endpoint devices to be configured and reconfigured for communication sessions, such as to improve session performance across network paths that may have variable packet quality.

Having discussed some example procedures, consider now a discussion of an example system and device in accordance with one or more implementations.

Figure 12:
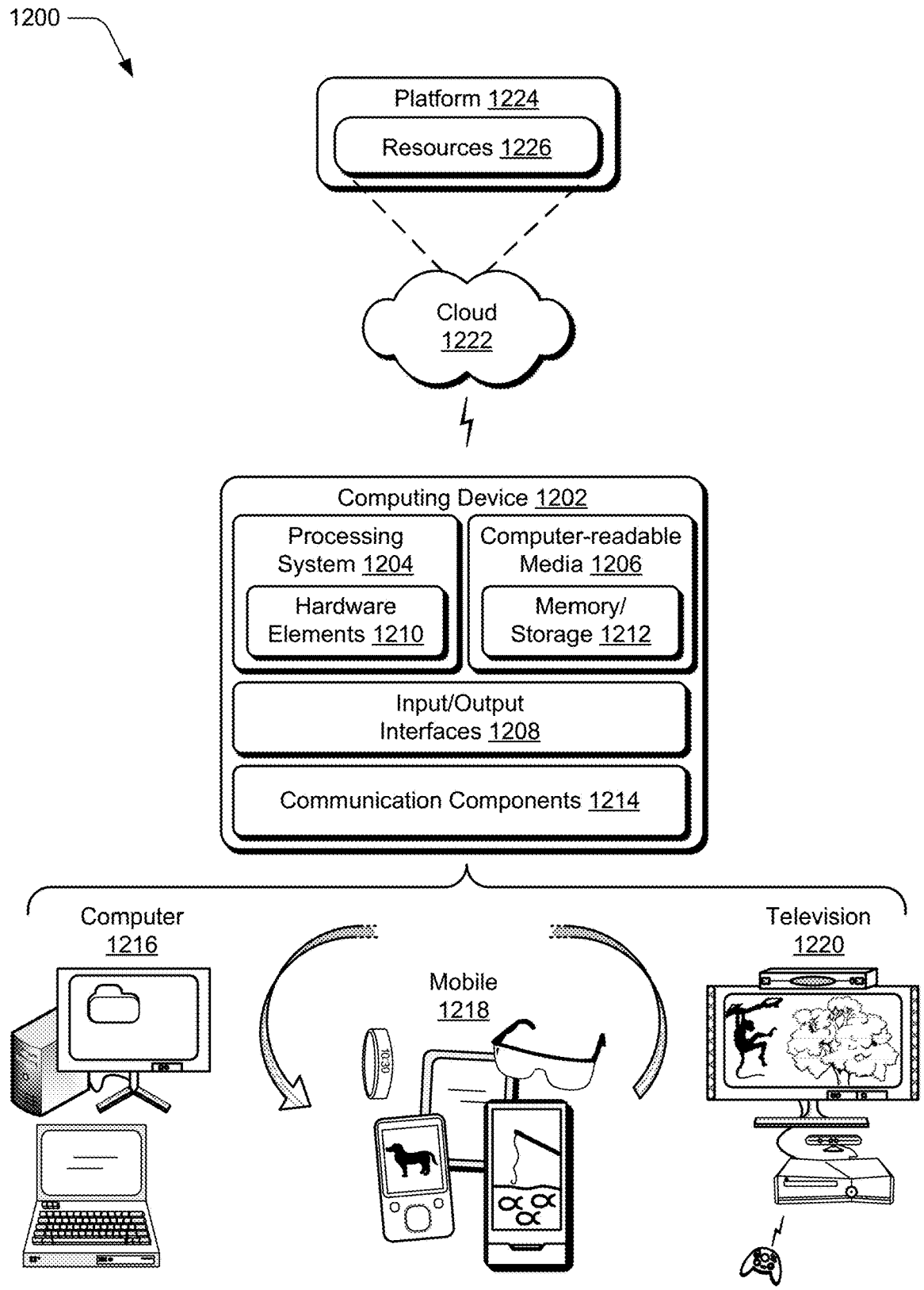
FIG. 12 illustrates an example system and computing device as described with reference to FIG. 1, which are configured to implement implementations of techniques described herein.

FIG. 12 illustrates an example system generally at 1200 that includes an example computing device 1202 that is representative of one or more computing systems and/or devices that may implement various techniques described herein. For example, the endpoint devices 102, the communication service 120, and/or the connectivity service 122 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

The computing device 1202 further includes communication components 1214, which are representative of functionality to receive and transmit data for the computing device 1202. For instance, the communication components 1214 represent components for interfacing and communicating with a network, such as via any suitable wired and/or wireless protocol. According to various implementations, the communication components 1214 receive data transmitted to the computing device 1202 and route the data to one or more other components of the computing device 1202. Further, the communication components 1214 receive data from one or more internal components of the computing device 1202, and cause the data to be communicated to various entities (e.g., devices) remote from the computing device 1202.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1216, mobile 1218, and television 1220 uses. Each of these configurations includes devices that may have generally different constructs and capabilities, and thus the computing device 1202 may be configured according to one or more of the different device classes. For instance, the computing device 1202 may be implemented as the computer 1216 class of a device that includes a personal computer, desktop computer, a multi-screen computer, laptop computer, netbook, and so on.

The computing device 1202 may also be implemented as the mobile 1218 class of device that includes mobile devices, such as a mobile phone, portable music player, portable gaming device, a tablet computer, a wearable device, a multi-screen computer, and so on. The computing device 1202 may also be implemented as the television 1220 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the communication service 120 and the connectivity service 122 may be implemented all or in part through use of a distributed system, such as over a "cloud" 1222 via a platform 1224 as described below.

The cloud 1222 includes and/or is representative of a platform 1224 for resources 1226. The platform 1224 abstracts underlying functionality of hardware (e.g., servers) and software resources of the cloud 1222. The resources 1226 may include applications and/or data that can be utilized while computer processing is executed on servers that are remote from the computing device 1202. Resources 1226 can also include services provided over the Internet and/or through a subscriber network, such as a cellular or Wi-Fi network.

The platform 1224 may abstract resources and functions to connect the computing device 1202 with other computing devices. The platform 1224 may also serve to abstract scaling of resources to provide a corresponding level of scale to encountered demand for the resources 1226 that are implemented via the platform 1224. Accordingly, in an interconnected device implementation, implementation of functionality described herein may be distributed throughout the system 1200. For example, the functionality may be implemented in part on the computing device 1202 as well as via the platform 1224 that abstracts the functionality of the cloud 1222.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Techniques for endpoint configuration for a communication session are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for causing an endpoint device to be configured for a communication session, the system including: at least one processor; and one or more computer-readable storage media including instructions stored thereon that, responsive to execution by the at least one processor, cause the system perform operations including: receiving a query for a network path for routing a communication session; identifying a candidate path for routing the communication session based on quality attribute of the candidate path; determining, based on a group policy associated with the communication session, configuration information for an endpoint device of the communication session; and communicating a notification that includes path information that identifies the candidate path and the configuration information to cause the communication session to be routed over the candidate path and the endpoint device to be configured according to the configuration information.

In addition to any of the above described systems, any one or combination of: wherein the query is received and the notification is communicated prior to initiation of the communication session; wherein the query is received at a cloud service that stores information for routing paths based on historical communication sessions and an attribute of a current active communication session; wherein the query is received at a cloud service that stores information for routing paths based on historical applications and services that were routed through the routing paths; wherein the configuration information is determined at a cloud service that stores one or more attributes of the candidate path and one or more attributes of the endpoint device, and wherein the configuration information is configured to improve media quality of the communication session at the endpoint device; further comprising determining that the candidate path has an error condition, and wherein the configuration information is configured to mitigate an effect of the error condition on a packet quality of the communication session at the endpoint device; further comprising determining that the candidate path has an error condition, and wherein the configuration information indicates that a data rate of a codec of the endpoint device is to be reduced; further comprising determining that the candidate path has an error condition, and wherein the configuration information indicates that error correction of an error correction functionality of the endpoint device is to be increased; wherein the configuration information is determined at a cloud service that stores one or more attributes of the candidate path and one or more attributes of the endpoint device, the one or more attributes of the candidate path indicate that the candidate path has an error condition, the one or more attributes of the endpoint device indicate a data rate of a codec of the endpoint device, and wherein the configuration information indicates that the endpoint device is to reduce the data rate of the codec; wherein the communication session includes the endpoint device and a different endpoint device, and where said determining the configuration information comprises: ascertaining based on the group policy that the endpoint device has a higher priority than the different endpoint device; and generating the configuration information to prioritize a media quality at the endpoint device over a media quality at the different endpoint device; wherein the operations further include: receiving an indication that a packet quality of the communication session is decreasing; generating reconfiguration information that specifies one or more of an updated setting for a codec of the endpoint device, and updated setting for an error correction functionality of the endpoint device, or an indication of the decreasing packet quality of the communication session; and communicating a further notification that includes the reconfiguration information to cause the endpoint device to be reconfigured according to the reconfiguration information; wherein the communication session includes the endpoint device and a different endpoint device, and where said determining the configuration information comprises: receiving an indication that a packet quality of the communication session is decreasing; generating reconfiguration information for reconfiguring the endpoint device, the reconfiguration information being generated based on the group policy specifying that the endpoint device has a higher priority than the different endpoint device such that the reconfiguration information is generated to prioritize media quality at the endpoint device over media quality at the different endpoint device; and communicating a further notification that includes the reconfiguration information to cause one or more of the endpoint device or the different endpoint device to be reconfigured according to the reconfiguration information.

A computer-implemented method for causing an endpoint device to be configured for a communication session, the method including: submitting a query for a routing path for routing a communication session; receiving a response identifying a candidate path and including configuration information for configuring an endpoint device of the communication session, the configuration information including one or more of a setting to be applied by the endpoint device, or an indication of a quality attribute of the candidate path; causing the endpoint device to be configured according to the configuration information; and causing the communication session to be routed over the candidate path.

In addition to any of the above described methods, any one or combination of: wherein the query is submitted and the response is received prior to initiation of the communication session; wherein the configuration information indicates that a codec rate of a codec of the endpoint device is to be reduced; wherein the configuration information indicates that error correction of an error correction functionality of the endpoint device is to be increased; further comprising: receiving a notification that packet quality of the communication session is decreasing; submitting a query for updated configuration information; receiving a query responsive that includes reconfiguration information for reconfiguring one or more of a setting of a codec or a setting of an error correction functionality; and causing the endpoint device to be reconfigured according to the reconfiguration information.

A computer-implemented method for causing an endpoint device to be configured for a communication session, the method including: receiving at an endpoint device routing path information and configuration information for configuring the endpoint device, the configuration information including one or more of a setting for a codec of the endpoint device, a setting for an error correction functionality of the endpoint device, or an indication of path quality of the routing path; configuring the endpoint device based on the configuration information; and exchanging communication media over the routing path as part of a communication session with one or more other endpoint devices.

In addition to any of the above described methods, any one or combination of: wherein said configuring comprises configuring one or more of the codec or the error correction functionality based on the configuration information and prior to initiation of the communication session; wherein the indication of path quality comprises an indication of packet quality of the routing path.

What is claimed is:

1. A system comprising:
   a connectivity service device, the connectivity service device comprising at least one hardware processor, and
   one or more computer-readable storage media including instructions stored thereon that, responsive to execution by the at least one hardware processor, cause the hardware processor of the connectivity service device to perform operations including:
      receiving, by the connectivity service device, a query for a network path for routing a communication session for an endpoint device that is separate from the connectivity service device;
      identifying a candidate path for routing the communication session for the endpoint device based on a quality attribute of the candidate path;
      determining, based on one or more attributes of the endpoint device, a data rate at which the endpoint device is generating data;
      determining by the connectivity service device and based on a group policy associated with a predefined group of devices that include the endpoint device, the quality attribute of the candidate path for routing the communication session for the endpoint device, and the data rate at which the endpoint device is generating data, configuration information for the endpoint device indicating a change to the data rate at which the endpoint device is generating data, wherein the group policy defines a set of configuration rules that apply to each device of the predefined group of devices; and
      communicating, by the connectivity service device, a notification that includes path information that identifies the candidate path and the configuration information to cause the communication session to be routed over the candidate path and to cause the endpoint device to be configured according to the configuration information.

2. A system as recited in claim 1, wherein the query is received and the notification is communicated prior to initiation of the communication session.

3. A system as recited in claim 1, wherein the query is received from the endpoint device.

4. A system as recited in claim 1, wherein the connectivity service device runs a connectivity service that stores information for routing paths based on historical applications and services that were routed through the routing paths, and the query is received by the connectivity service.

5. A system as recited in claim 1, wherein a connectivity service executes on the connectivity service device, and the configuration information is determined by the connectivity service which stores one or more attributes of the candidate path and one or more attributes of the endpoint device, and wherein the configuration information is configured by the connectivity service to improve media quality of the communication session at the endpoint device.

6. A system as recited in claim 1, the operations further comprising determining that the candidate path has an error condition, and wherein the configuration information is configured by the connectivity service device to mitigate an effect of the error condition on a packet quality of the communication session at the endpoint device.

7. A system as recited in claim 1, the operations further comprising determining, by a connectivity service executing on the connectivity service device, that the candidate path has an error condition, and wherein the configuration information indicates that a data rate of a codec of the endpoint device is to be reduced.

8. A system as recited in claim 1, the operations further comprising determining, by a connectivity service executing on the connectivity service device, that the candidate path has an error condition, and wherein the configuration information indicates that error correction of an error correction functionality of the endpoint device is to be increased.

9. A system as recited in claim 1, wherein the configuration information is determined by a connectivity service executing on the connectivity service device which stores one or more attributes of the candidate path and one or more attributes of the endpoint device, the one or more attributes of the candidate path indicate that the candidate path has an error condition, the one or more attributes of the endpoint device indicate a data rate of a codec of the endpoint device, and wherein the configuration information indicates that the endpoint device is to reduce the data rate of the codec.

10. A system as recited in claim 1, wherein the communication session includes the endpoint device and a different endpoint device, and where said determining the configuration information comprises:
    ascertaining, by the connectivity service device, based on the group policy that the endpoint device has a higher priority than the different endpoint device; and
    generating, by the connectivity service device, the configuration information to prioritize a media quality at the endpoint device over a media quality at the different endpoint device.

11. A system as recited in claim 1, wherein the operations further include:
    receiving an indication that a packet quality of the communication session is decreasing;
    generating reconfiguration information that specifies one or more of an updated setting for a codec of the endpoint device, and updated setting for an error correction functionality of the endpoint device, or an indication of the decreasing packet quality of the communication session; and communicating a further notification that includes the reconfiguration information to cause the endpoint device to be reconfigured according to the reconfiguration information.

12. A system as recited in claim 1, wherein the communication session includes the endpoint device and a different endpoint device, and where said determining the configuration information comprises:
receiving an indication that a packet quality of the communication session is decreasing;
generating reconfiguration information for reconfiguring the endpoint device, the reconfiguration information being generated based on the group policy specifying that the endpoint device has a higher priority than the different endpoint device such that the reconfiguration information is generated to prioritize media quality at the endpoint device over media quality at the different endpoint device; and
communicating a further notification that includes the reconfiguration information to cause one or more of the endpoint device or the different endpoint device to be reconfigured according to the reconfiguration information.

13. The system of claim 1, wherein the endpoint device and a second endpoint device are communication peers and communicate with each other to maintain the communication session, wherein each of the endpoint device and second endpoint device are endpoints in the communication session.

14. The system of claim 13, the operations further comprising communicating, by a communications service device, the notification to a second endpoint device of the communication session, the notification including configuration instructions for the second endpoint device to configure itself for the communication session.

15. A computer-implemented method comprising:
receiving, by a connectivity service device comprising at least one hardware processor, a query for a network path for routing a communication session for an endpoint device that is separate from the connectivity service device;
identifying, by the connectivity service device, a candidate path for routing the communication session for the endpoint device based on a quality attribute of the candidate path;
determining, by the connectivity service device and based on one or more attributes of the endpoint device, a data rate at which the endpoint device is generating data;
determining, by the connectivity service device and based on a group policy associated with a predefined group of devices that include the endpoint device, the quality attribute of the candidate path for routing the communication session for the endpoint device, and the data rate at which the endpoint device is generating data, configuration information for the endpoint device indicating a change to the data rate at which the endpoint device is generating data, wherein the group policy defines a set of configuration rules that apply to each device of the predefined group of devices; and
communicating, by the connectivity service device, a notification that includes path information that identifies the candidate path and the configuration information to cause the communication session to be routed over the candidate path and to cause the endpoint device to be configured according to the configuration information.

16. A method as recited in claim 15, further comprising determining that the candidate path has an error condition, and wherein the configuration information is configured by the connectivity service device to mitigate an effect of the error condition on a packet quality of the communication session at the endpoint device.

17. A method as recited in claim 15 further comprising determining, by a connectivity service executing on the connectivity service device, that the candidate path has an error condition, and wherein the configuration information indicates that a data rate of a codec of the endpoint device is to be reduced.

18. A method as recited in claim 15, further comprising determining, by a connectivity service executing on the connectivity service device, that the candidate path has an error condition, and wherein the configuration information indicates that error correction of an error correction functionality of the endpoint device is to be increased.

19. A method as recited in claim 15, wherein the configuration information is determined by a connectivity service executing on the connectivity service device which stores one or more attributes of the candidate path and one or more attributes of the endpoint device, the one or more attributes of the candidate path indicate that the candidate path has an error condition, the one or more attributes of the endpoint device indicate a data rate of a codec of the endpoint device, and wherein the configuration information indicates that the endpoint device is to reduce the data rate of the codec.

20. A method as recited in claim 15, wherein the communication session includes the endpoint device and a different endpoint device, and where said determining the configuration information comprises:
ascertaining, by the connectivity service device, based on the group policy that the endpoint device has a higher priority than the different endpoint device; and
generating, by the connectivity service device, the configuration information to prioritize a media quality at the endpoint device over a media quality at the different endpoint device.

21. A method as recited in claim 15, further comprising:
receiving an indication that a packet quality of the communication session is decreasing;
generating reconfiguration information that specifies one or more of an updated setting for a codec of the endpoint device, and updated setting for an error correction functionality of the endpoint device, or an indication of the decreasing packet quality of the communication session; and
communicating a further notification that includes the reconfiguration information to cause the endpoint device to be reconfigured according to the reconfiguration information.

* * * * *